United States Patent
Graves

(10) Patent No.: US 7,245,798 B2
(45) Date of Patent: Jul. 17, 2007

(54) APPARATUS FOR REDIRECTING OPTICAL SIGNALS IN FREE SPACE

(75) Inventor: Alan Graves, Kanata (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 130 days.

(21) Appl. No.: 10/925,943

(22) Filed: Aug. 26, 2004

(65) Prior Publication Data
US 2006/0045414 A1   Mar. 2, 2006

(51) Int. Cl.
*G02B 6/26* (2006.01)
*H04B 10/00* (2006.01)

(52) U.S. Cl. ............................. 385/16; 385/20; 398/111

(58) Field of Classification Search ............ 385/16–18; 398/12, 19, 45, 111
See application file for complete search history.

(56) References Cited

U.S. PATENT DOCUMENTS

| | | | |
|---|---|---|---|
| 6,344,937 B1 * | 2/2002 | Sparrold et al. ............ | 359/837 |
| 6,650,803 B1 | 11/2003 | Ramaswami et al. | |
| 6,778,739 B1 * | 8/2004 | Jerphagnon et al. .......... | 385/52 |
| 6,922,500 B2 * | 7/2005 | Huang et al. ................. | 385/18 |
| 6,947,623 B2 | 9/2005 | Ramaswami et al. | |
| 2001/0046345 A1 * | 11/2001 | Snyder et al. ................ | 385/16 |
| 2003/0138193 A1 * | 7/2003 | Sweatt et al. ................. | 385/17 |
| 2003/0202732 A1 * | 10/2003 | Glebov et al. ................ | 385/16 |

* cited by examiner

*Primary Examiner*—Frank G. Font
*Assistant Examiner*—Charlie Peng

(57) ABSTRACT

Apparatus for redirecting a plurality of optical beams emanating from a respective plurality of optical transmitters arranged in a pattern along a first dimension and a second dimension. The apparatus comprises a plurality of refractive regions. Each refractive region intercepts the optical beams emanating from an associated group of optical transmitters occupying a common position in the first dimension. In addition, each particular refractive region imparts to the intercepted optical beams an angular deflection in the first dimension, the angular deflection in the first dimension being a function of the common position in the first dimension occupied by the optical transmitters from which emanate the optical beams intercepted by the particular refractive region. Use of the refractive regions reduces the amount of available deflection area left unused when a parallel set of port cards is employed for switching optical signals.

7 Claims, 30 Drawing Sheets

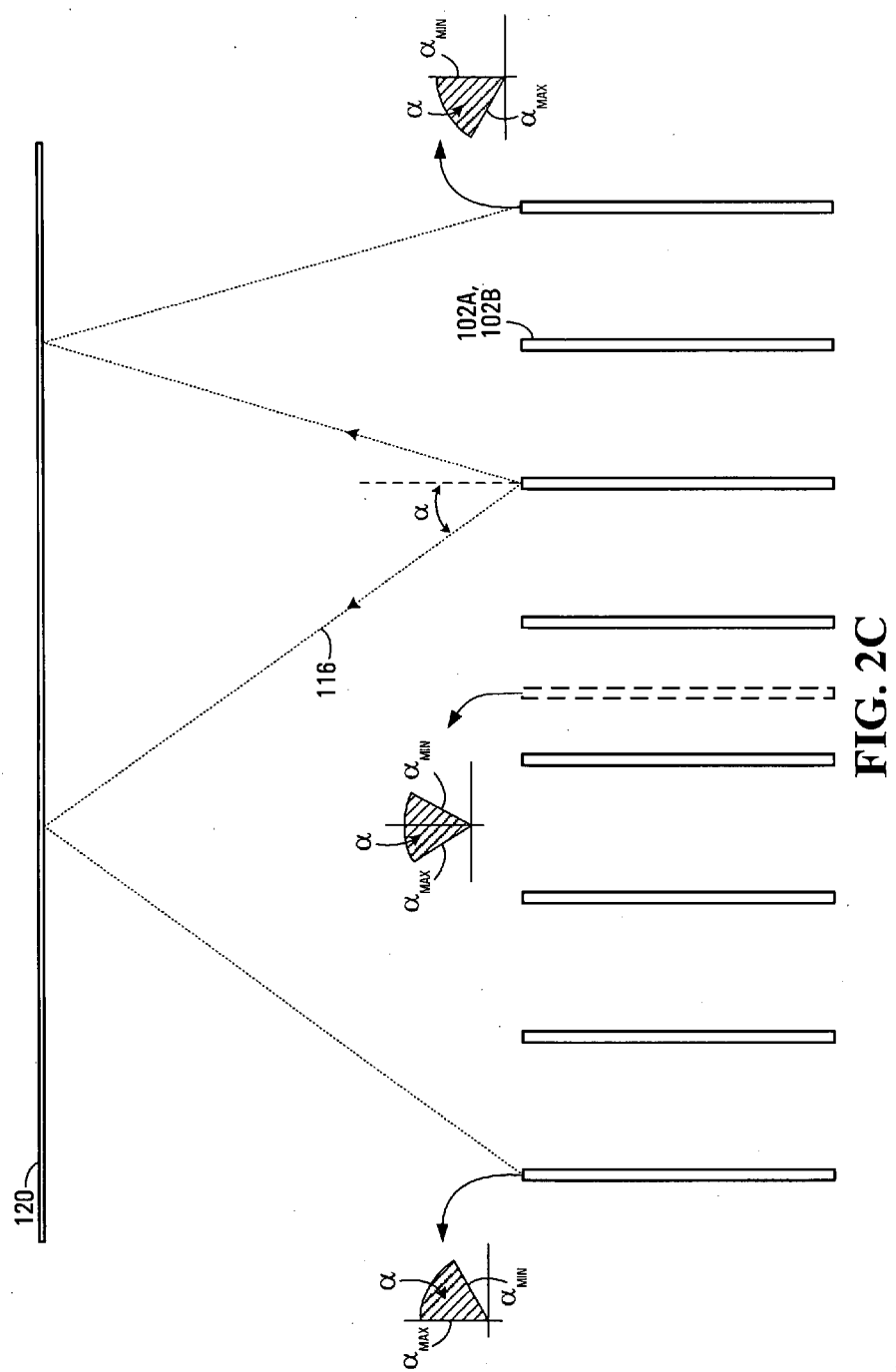

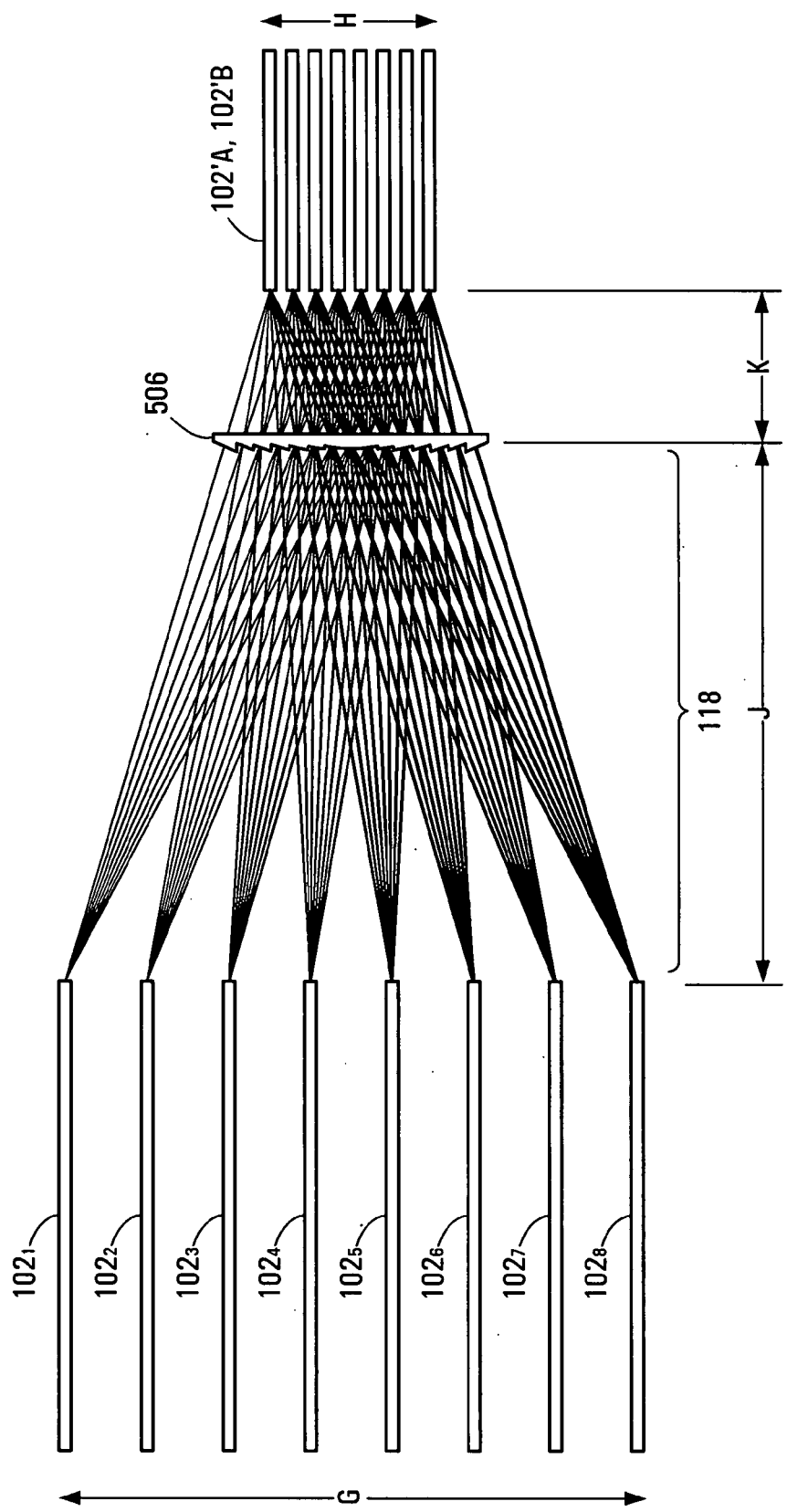

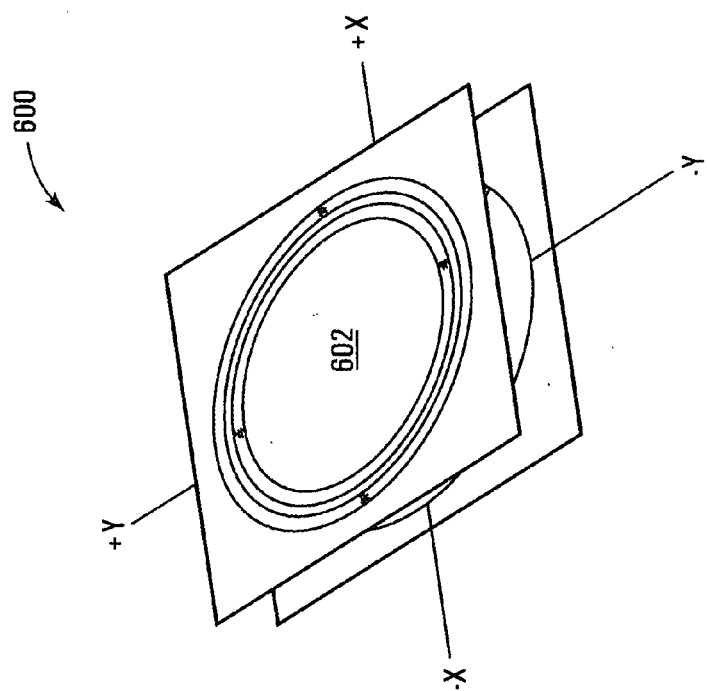
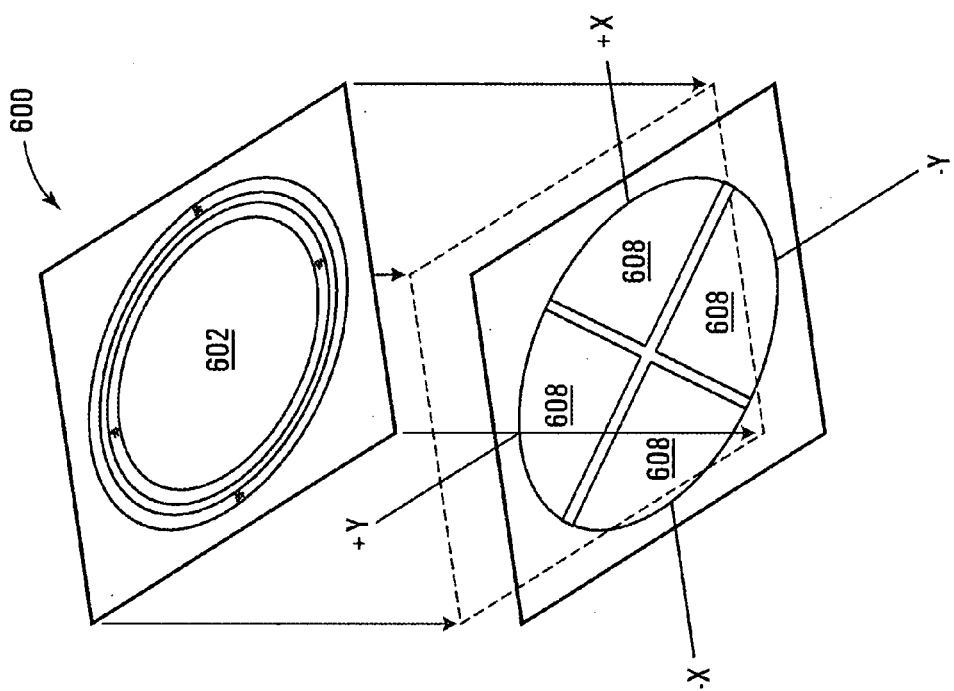
FIG. 6B
FIG. 6A

T1

T2

T3

T4

APPARATUS FOR REDIRECTING OPTICAL SIGNALS IN FREE SPACE

CROSS-REFERENCES TO RELATED APPLICATIONS

The present application is related in subject matter to two U.S. patent applications entitled "APPARATUS FOR SWITCHING OPTICAL SIGNALS" and "SYSTEM AND METHOD FOR CONTROLLING DEFLECTION OF OPTICAL BEAMS", both to Alan Graves, both filed on the same date as the present application and both hereby incorporated by reference herein.

FIELD OF THE INVENTION

The present invention relates generally to optical communications and, more particularly, to an apparatus for redirecting optical signals in free space.

BACKGROUND OF THE INVENTION

As optical signals used in optical communications carry ever increasing data rates according to an ever widening variety of data standards, it becomes desirable to provide switching at the photonic level, i.e., without resorting to electronic circuitry for converting the optical signals into the electrical domain before switching is performed. These types of optical switches are referred to as photonic (or OOO—short for "Optical Input, Optically Switched, Optical Output") switches.

The desirable characteristics of a photonic switch are scalability, robustness and the ability to provide non-blocking performance in a compact low-cost package. Generally speaking, first-generation photonic switches afford at most two of these benefits at the expense of the other(s) in packages compromised in size and cost due to the complex, usually fiber-guided, interconnect between the various modules of the switch.

For example, first-generation photonic switches that are scalable by virtue of a modular design (e.g., multiple planes on a per-wavelength, or per-wavelength-group, basis) typically require a wavelength conversion unit to provide a satisfactory level of residual blocking performance. This introduces inefficiencies in provisioning the switch. Also, since optical signals are converted into the electrical domain for the purposes of wavelength conversion, switches of this type lose the designation of being truly photonic in nature. Moreover, in lambda-plane switches, the optical interconnect requires up to thousands of individual optical fiber connections, which can be reduced in size somewhat by the provision of an orthogonal shuffle function, but this nevertheless results in a non-compact solution.

Other designs, such as multi-stage photonic switches (e.g., CLOS), can be made non-blocking through dilation or path rearranging, but do not scale well to accommodate an increase in the number of input signals. In particular, the complexity of the interconnect between stages becomes intractable as the number of input signals increases. Furthermore, in addition to introducing a delay, the multi-stage characteristic of these switches imparts a higher path loss due to multiple lossy switching operations in series that need to be compensated for in the design.

Still other first-generation photonic switch architectures, such as the Xros X-1000, utilize opposing arrays of independently controllable mirrors at the end of an optical chamber to achieve non-blocking performance. However, these switches tend to be large in size, have low tolerance to manufacturing error and also do not scale well due to a lack of modularity. In addition, such switches have a complex fiber-based interconnect.

Against this background, it is clear that there exists a need in the industry for improvement in the area of photonic switches.

SUMMARY OF THE INVENTION

In accordance with a first broad aspect, the present invention seeks to provide an apparatus for redirecting a plurality of optical beams emanating from a respective plurality of optical transmitters arranged in a pattern along a first dimension and a second dimension. The apparatus comprises a plurality of refractive regions. Each refractive region intercepts the optical beams emanating from an associated group of optical transmitters occupying a common position in the first dimension. In addition, each particular refractive region imparts to the intercepted optical beams an angular deflection in the first dimension, the angular deflection in the first dimension being a function of the common position in the first dimension occupied by the optical transmitters from which emanate the optical beams intercepted by the particular refractive region.

In accordance with a second broad aspect, the present invention seeks to provide an apparatus for switching optical signals. The apparatus comprises a transmit entity adapted to emit a plurality of optical beams along a first plurality of parallel planes of travel, the parallel planes of travel in the first plurality of parallel planes of travel occupying respective first positions along a normal to the first plurality of parallel planes of travel. The apparatus further comprises a deflection entity adapted to receive the optical beams from the transmit entity and to deflect the received optical beams into a plurality of deflected optical beams along a second plurality of parallel planes of travel, the parallel planes of travel in the second plurality of parallel planes of travel occupying respective second positions along said normal to the first plurality of parallel planes of travel, each of the second positions being distinct from each of the first positions. Finally, the apparatus comprises a receive entity adapted to receive the deflected optical beams from the deflection entity.

In accordance with a third broad aspect, the present invention seeks to provide an apparatus for switching optical signals. The apparatus comprises a transmit entity adapted to emit a plurality of optical beams having respective directions of travel. The apparatus also comprises a receive entity adapted to receive a plurality of deflected optical beams from respective directions of arrival. Finally, the apparatus comprises a reflective entity comprising a first reflective surface and a second reflective surface held in a fixed relative position to one another, the first reflective surface adapted to deflect the optical beams upon receipt from the transmit entity towards the second reflective surface, the second reflective surface being adapted to deflect the optical beams received from the first reflective surface towards the receive entity as the plurality of deflected optical beams.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 2A-2C are, respectively, perspective, side elevational and plan views of an apparatus for switching optical signals in accordance with an embodiment of the present invention;

FIG. 5C is a plan view of an apparatus for switching optical signals in accordance with an embodiment of the present invention, comprising a reflector with multiple facets;

FIG. 6 is a perspective view of a beam steering element capable of causing controllable deflection of an optical beam;

DETAILED DESCRIPTION OF THE EMBODIMENTS

Figure 2A:
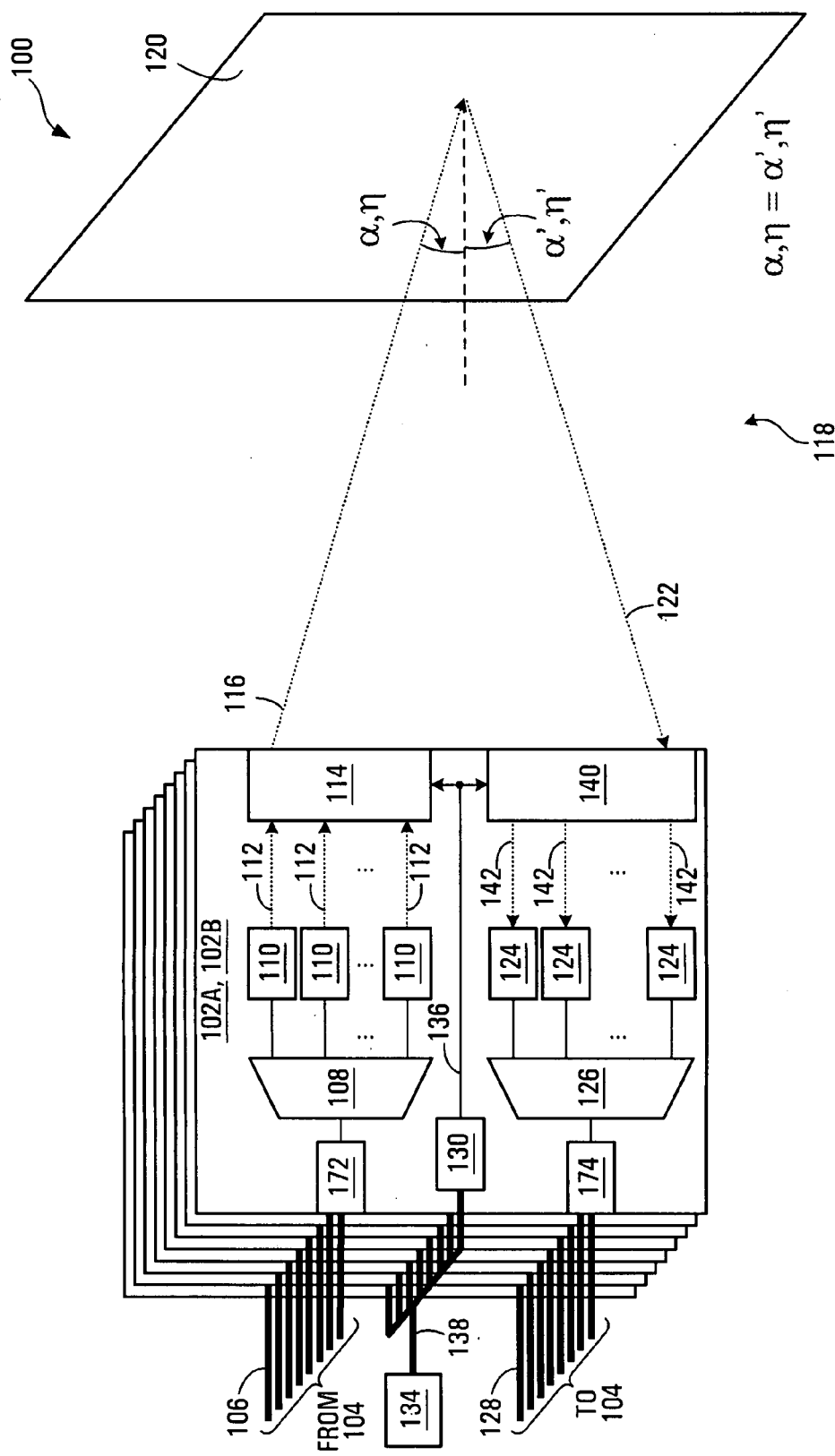
Figure 2B:
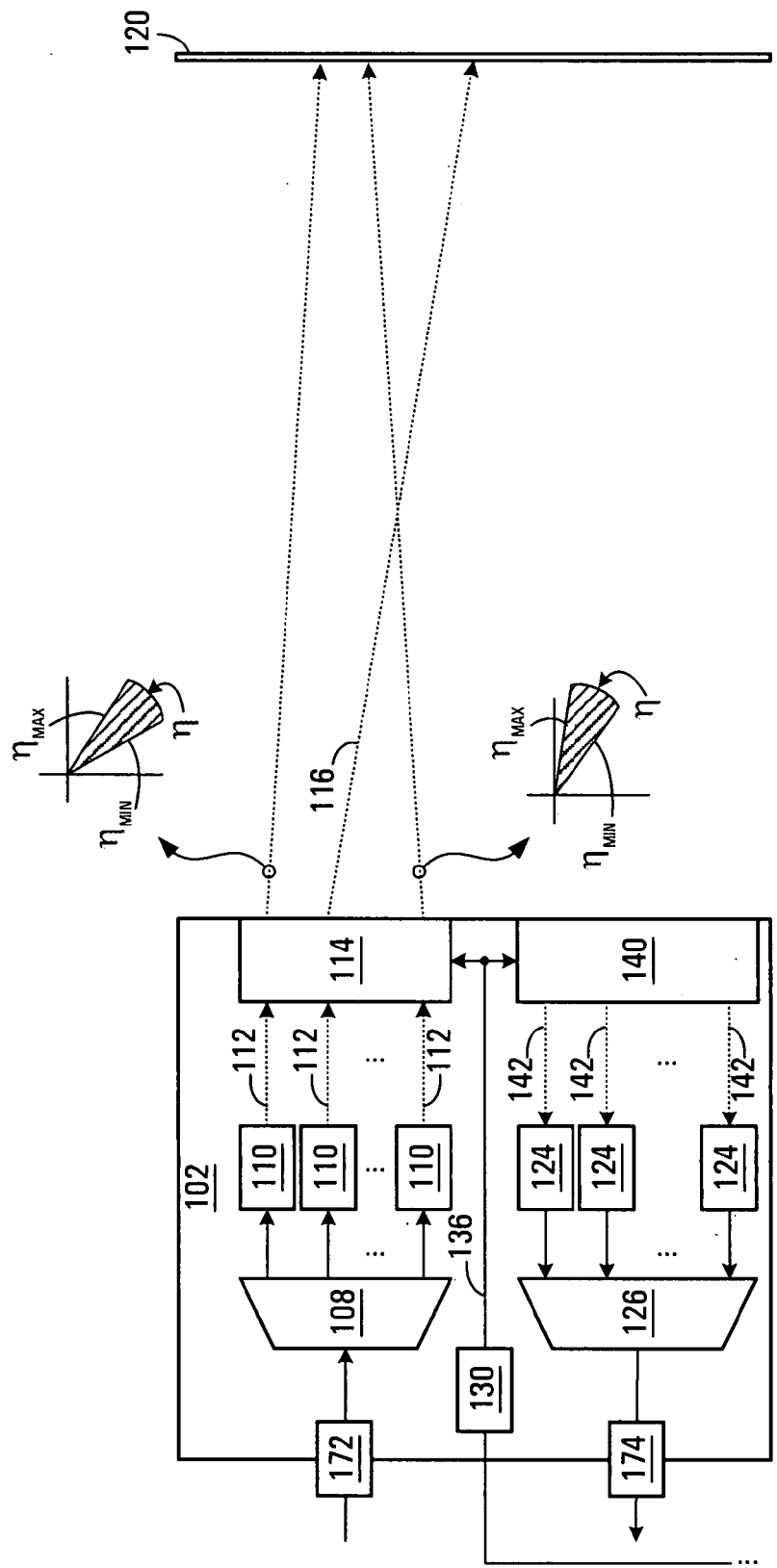
Figure 2D:
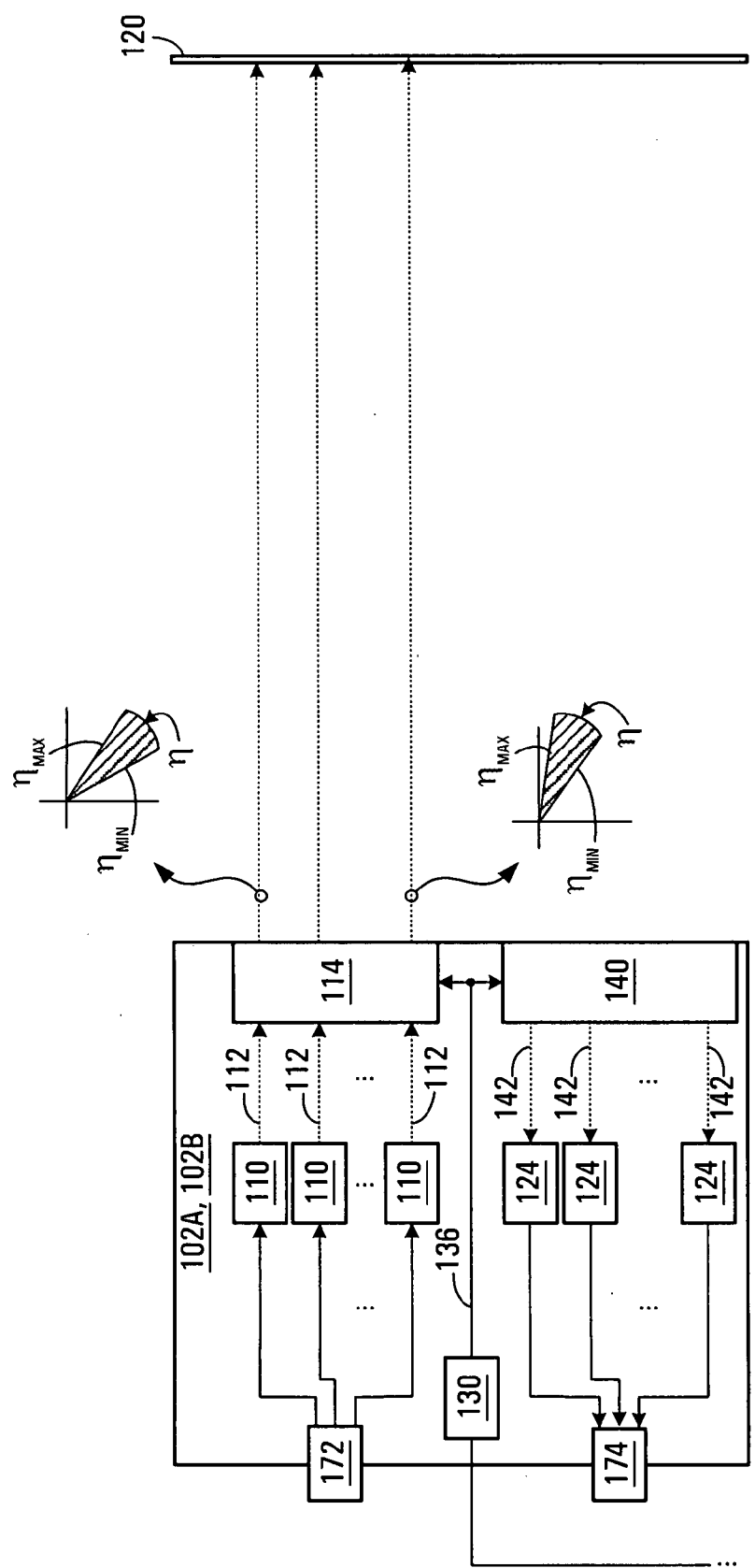
FIG. 2D is a side elevational view of a port card for use in an apparatus for switching optical signals in accordance with an embodiment of the present invention.

With reference to FIGS. 2A-2C, an apparatus for photonically switching optical signals (i.e., the signals remain in a photonic form throughout the switch node paths) in accordance with an embodiment of the present invention, hereinafter referred to as a photonic switch 100, includes a provisionable plurality of port cards 102A, 102B, also sometimes referred to as tributary cards, trib cards, input/output (I/O) cards, etc. From a mechanical standpoint, the port cards 102A, 102B of the switch 100 may stand on edge in a side-by-side manner, supported by slots of a card cage. The port cards 102A, 102B exchange optical signals with other elements of the overall photonic network of which the switch 100 is a part (not shown, but designated by the reference numeral 104) and which are external to the switch 100. The port cards include transmit port cards 102A (so called because they cause optical signals to be transmitted into an optical chamber 118) and receive port cards 102B (so called because they receive optical signals from the optical chamber 118). In some embodiments of the present invention (including but not limited to FIGS. 2A-2D and FIGS. 3A-3E), the port cards are dual function port cards, i.e., the transmit port cards 102A are the same as the receive port cards 102B. In other embodiments of the present invention (including but not limited to FIGS. 4A-4C), the transmit port cards 102A are distinct from the receive port cards 102B.

The transmit port cards 102A receive input optical signals, e.g., along fiber optic cables 106 and connectors 172, from the external entities 104. Various optical processing functions are performed in customized signal conditioning and processing functions of the transmit port cards 102A. For example, in FIGS. 2A and 2B, the input optical signal is an input multi-carrier optical signal such as a dense wavelength division multiplexed (DWDM) signal. Here, an input signal conditioning module 108 on each transmit port card 102A provides demultiplexing and other processing of the input optical signals. Other functionalities are possible, dependent upon the signal conditioning and processing functions needing to be implemented on the transmit port card 102A. In still other cases, for example, in FIG. 2D, where individual optical carrier signals are received via a ribbon cable, there is no need for an input signal conditioning module.

The output of the input signal conditioning module 108 is a set of individual optical carrier signals sent to a set of respective optical coupling elements (such as rod lenses or "GRIN" lenses, hereinafter referred to as optical transmitter elements 110) to couple from a waveguide environment within the substrate of the transmit port card 102A into a free-space parallel sided optical beam. Thus, the optical transmitter elements 110 on each transmit port card 102A transform the individual optical carrier signals from their guided wave environment on the transmit port card 102A into respective parallel (non-divergent) optical beams 112. In an example implementation, the optical transmitter elements 110 comprise rod lenses or beam collimators aligned to the substrate waveguides of the transmit port card 102A by the use of V-grooves etched into the edge of a silicon substrate, into which the rod lenses or beam collimators are placed.

Each of the optical beams 112 acquires an initial direction given by the corresponding optical transmitter element 110, which is independently and individually modified by one or more beam steering elements in a transmit beam steering element array 114. The resulting optical beams, hereinafter referred to as "oriented" optical beams 116, are projected into a free-space optical chamber 118, in the general direction of a reflector 120 although at distinct and precisely controlled individual angular directions of departure, each aimed at the virtual image (in the reflector 120) of a target receiver element on one of the receive port cards 102B. The direction of each beam in three-dimensional space will have a horizontal component (denoted by a horizontal deflection angle $\alpha$, see FIGS. 2A, 2C) and a vertical component (denoted by a vertical deflection angle $\eta$, see FIGS. 2A, 2B) for each oriented optical beam 116 emanating from a given transmit port card 102A. Each of the oriented optical beams 116 then undergoes reflection by the reflector 120 and is received at one of the received port cards 102B. It should be understood that the terms "horizontal" and "vertical" are chosen for convenience only, in order to describe two orthogonal dimensions, but these terms should not be considered as restrictive.

In the embodiment shown in FIGS. 2A-2C, the optical beams received at a given receive port card 102B, hereinafter referred to as "received optical beams" and denoted by the numeral 122, impinge upon a receive beam steering element array 140 on the given receive port card 102B. The receive beam steering element array 140 redirects the received optical beams 122 into respective deflected optical beams 142. The receive beam steering element array 140 provides a controllable amount of deflection which causes each of the deflected optical beams 142 to impinge directly on a respective one of a plurality of optical receive elements 124, allowing those elements to focus the beams 142 accurately on to the waveguide interface into the receive port card substrate at the far end of those elements.

In an example embodiment, the optical receive elements 124 can be constructed similarly to the optical transmitter elements 110, e.g., as V-grooves etched into the edge of a silicon substrate which carries the optical waveguides connecting to the rest of the receive port card 102B in combination with rod lenses mounted in those grooves. Each rod lens has the end of a respective waveguide at its focal point for the case where a parallel optical beam is input into the lens from free space in a direction along its axis. The optical receive elements 124 transform the deflected optical beams 142 into switched optical carrier signals, which are provided in a guided wave environment to an output signal conditioning module 126. The output of the signal conditioning module 126 is a plurality of switched optical signals, which are provided to the external entities 104, e.g., along fiber optic cables 128 via a connector 174. In an example, the output signal conditioning module 126 may perform multiplexing of multiple single-carrier optical signals. Of course, the output signal conditioning module 126 may perform other optical processing functions as required. In still other cases, for example in FIG. 2D, where a ribbon cable connects the optical receive elements 124 directly to the connector 174, there is no need for an output optical signal conditioning module.

When the transmit port cards 102A and the receive port cards 102B are of the type shown in FIGS. 2A-2C, the switch 100 operates as a linearly provisionable lambda plane switch. When the transmit port cards 102A and the receive port cards 102B are of the type shown in FIG. 2D, the switch 100 operates as a linearly scalable non-blocking switch. A mix of the two types of port cards allows one to build a lambda plane switch with any amount of add-drop to a lambda converter, allowing a wide variety of switch configurations to be constructed on a common platform. It is noted that these advantages are enabled by placing the optical switch elements (particularly the transmit and receive beam steering element arrays 114, 140) on the port cards, which can be done in a small physical space using hybrid optical integrated circuits (HOICs). Specifically, with the advent of hybrid optical integration, complex optical functions can be monolithically integrated into a silica-on-silicon substrate (e.g., array waveguide multiplexers, optical attenuators, thermo-optic switches, and even, with Erbium doping of the silica, optical amplification). These functions can be further augmented by hybridized components such as lasers, detectors and electronic chips in order to achieve a relatively complex, electrically controlled optical functionality in a relatively small space, especially in "height" (the dimension orthogonal to the plane of the substrate of the port card), which translates into a reduction of the required inter-card spacing or pitch. This allows the realization of switching implementations, modularities and partitionings that may have been viewed as impractical in the past.

In operation, the photonic switch 100 achieves switching action by virtue of the deflection angles ($\alpha$ and $\eta$) acquired by each of the oriented optical beams 116 under the action of the transmit beam steering element array 114 (the oriented optical beams 116 being pointed at virtual images of respective receive elements 124), and also by virtue of the action of the reflector 120. Alternatively, the optical receiver elements 124 themselves can be placed on the opposite side of the optical chamber 118 and the optical transmitter elements 110 then target the oriented optical beams 116 on the optical receiver elements 124 rather than on virtual images of the receivers in the reflector 120, thereby allowing the reflector to be dispensed with. In any event, by precisely controlling the angle at which the oriented optical beams 116 are sent away from the transmit port cards 102A, individual candidate beam steering elements within each receive beam steering element array 140 and the associated optical receive elements 124 can be reached as desired.

Control of the individual beam steering elements of the transmit and receive beam steering element arrays 114, 140 on each transmit and receive port card 102A, 102B is effected by a control module 130 responsible for the port card in question. It should be noted that the control module 130 responsible for a given transmit or receive port card 102A, 102B can be located on that port card itself, on another port card or on a separate "controller card"; alternatively, the various control modules 130 can be consolidated onto a smaller number of separate controller cards.

The control module 130 receives switching instructions from a switch controller 134, which can be implemented as a central shared resource that receives and acts on connection requests by interacting with the control modules 130 responsible for the various transmit and receive port cards 102A, 102B. One non-limiting way of supplying the switching instructions to the control module 130 is by way of a shared data bus 138. Other configurations are possible, including but not limited to a daisy chain among the port cards. The switching instructions identify individual combinations of optical transmitter elements 110 and optical receive elements 124 that are intended to be optically connected to one another, in order to satisfy some higher level switching function. For example, the switching instructions sent onto the data bus 138 may indicate "connect the $A^{th}$ optical transmitter element 110 on the $B^{th}$ transmit port card 102A to the $C^{th}$ optical receive element 124 on the $D^{th}$ receive port card 102B". These switching instructions are sent to the control modules 130 on both the $B^{th}$ transmit port card 102A and the $D^{th}$ port cards 102B. On the $B^{th}$ transmit port card 102A, the switching instructions are used to control the transmit beam steering element array 114 via a link 136 on the $B^{th}$ transmit port card 102A, while on the $D^{th}$ receive port card 102B, the switching instructions are used to control the receive beam steering element array 140 via the link 136 on the $D^{th}$ receive port card 102B.

From the above, it will be appreciated that the switching action provided by the switch 100 is non-blocking, since there is nothing to prevent any optical transmitter element 110 from optically connecting to any optical receive element 124 via their associated beam steering element arrays 114, 140 and the reflector 120. Also, it should be appreciated that as the number of transmit or receive port cards 102A, 102B is increased, the capacity of the switch 100 will grow in a linear fashion in proportion to the number of additional optical transmitter elements 110 and/or optical receive elements 124 located on the added port cards 102A, 102B. As an aside, it will be recognized that the number of port cards 102A, 102B, as well as the number of optical transmitter elements 110 per transmit port card 102A and the number of optical receive elements 124 per receive port card 102B, can have a wide range of values while remaining within the scope of the present invention.

From FIG. 2C, it will be apparent that the horizontal deflection angle α for a given transmit port card 102A ranges from a minimum horizontal deflection angle $α_{MIN}$ to a maximum horizontal deflection angle $α_{MAX}$, where the range depends on the position of the transmit port card 102A within the card cage. For example, the optical transmitter elements 110 located on transmit port cards 102A at the center (in the horizontal direction) have a range of potential horizontal deflection angles α that is symmetric about zero, while the optical transmitter elements 110 located on transmit port cards 102A at the rightmost edge have a range of potential horizontal deflection angles α that is entirely to the left, and the optical transmitter elements 110 located on transmit port cards 102A at the leftmost edge have a range of potential horizontal deflection angles α that is entirely to the right.

Now, in a design where all transmit port cards 102A are intended to be identical, one will need to pre-design them to provide a range of potential deflection angles α that is greater than necessary, since one needs to account for the positive, symmetric and negative cases described above and illustrated in FIG. 2C. The result is that, in use, each transmit port card 102A is effectively left unable to exploit about half of the pre-designed range of potential horizontal deflection angles α. This may be problematic, depending on the technology chosen for fabricating the individual beam steering elements of the transmit and receive beam steering element arrays 114, 140. For example, consider the case where the beam steering elements are 2-axis gimbaled MEMS mirrors having achievable deflection angles of +/−5-7 degrees of mechanical movement, resulting in +/−10-14 degrees of optical deflection. This can result in the requirement for a deep free-space optical chamber 118 and resultant long optical paths, with the commensurate difficulties in achieving the requisite pointing accuracy, as well as holding that pointing accuracy in the presence of mechanical vibration.

Figure 3A:
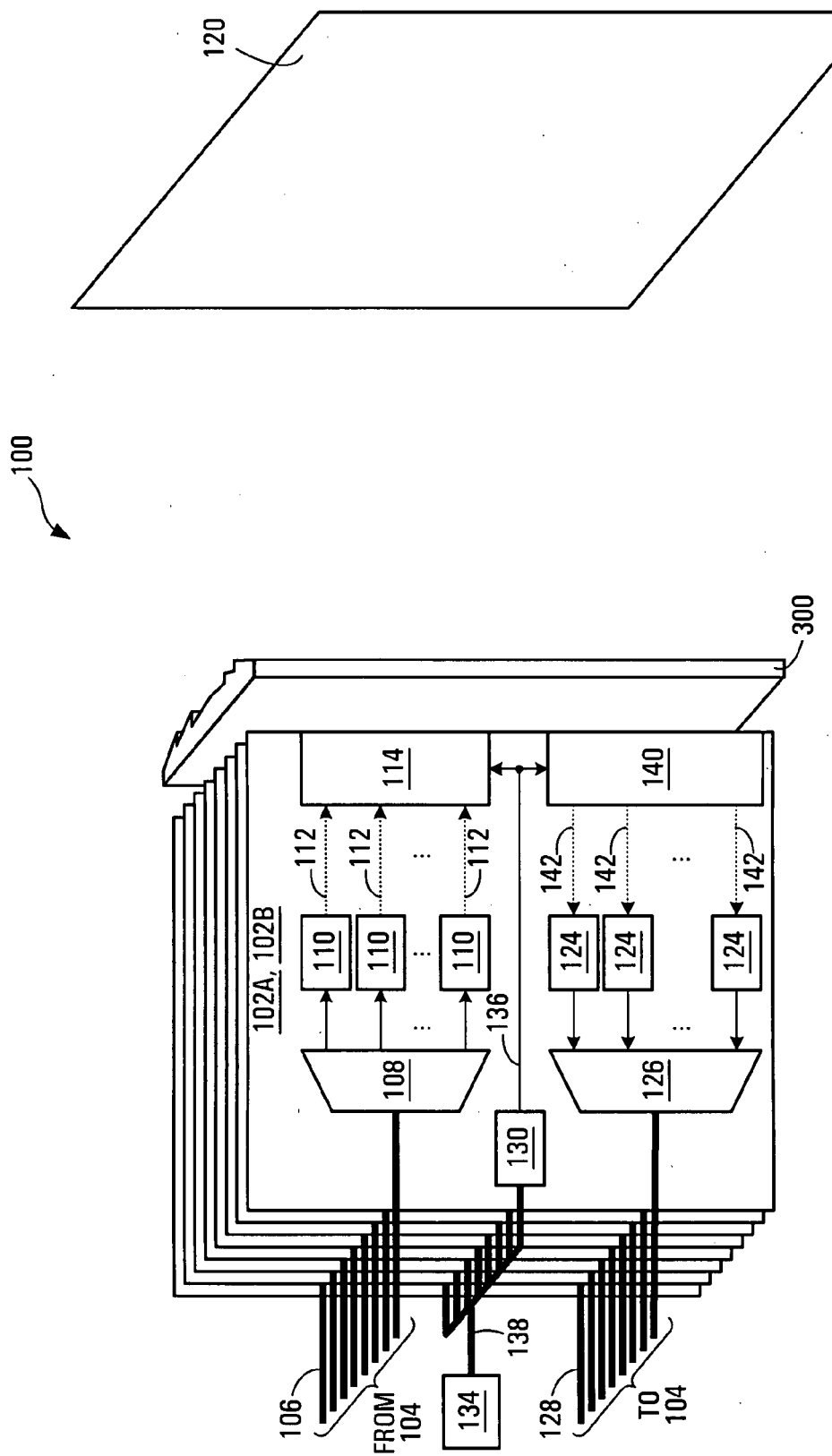
FIGS. 3A-3C are, respectively, perspective, side elevational and plan views of an apparatus for switching optical signals in accordance with an embodiment of the present invention, additionally comprising a prism plate.
Figure 3B:
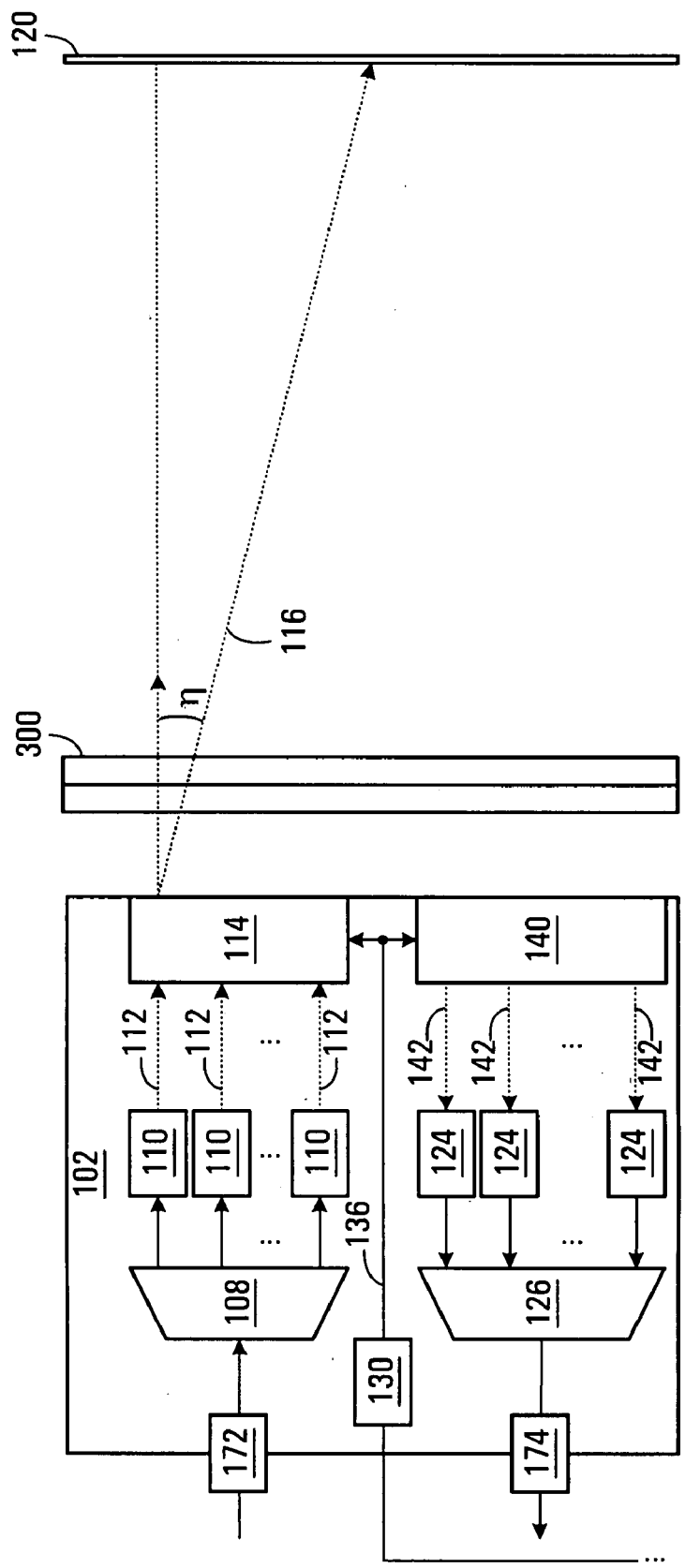
Figure 3C:
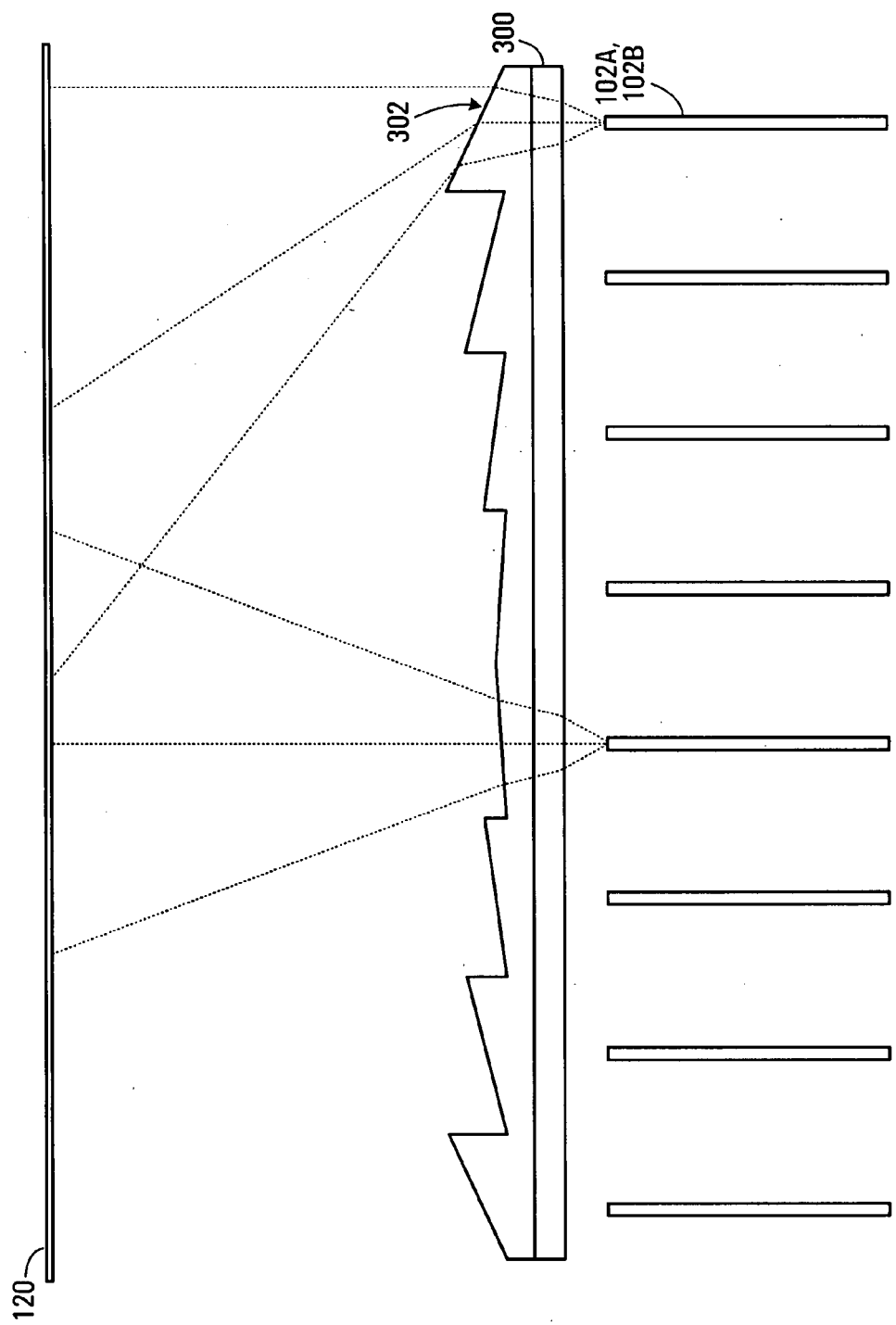
Figure 4A:
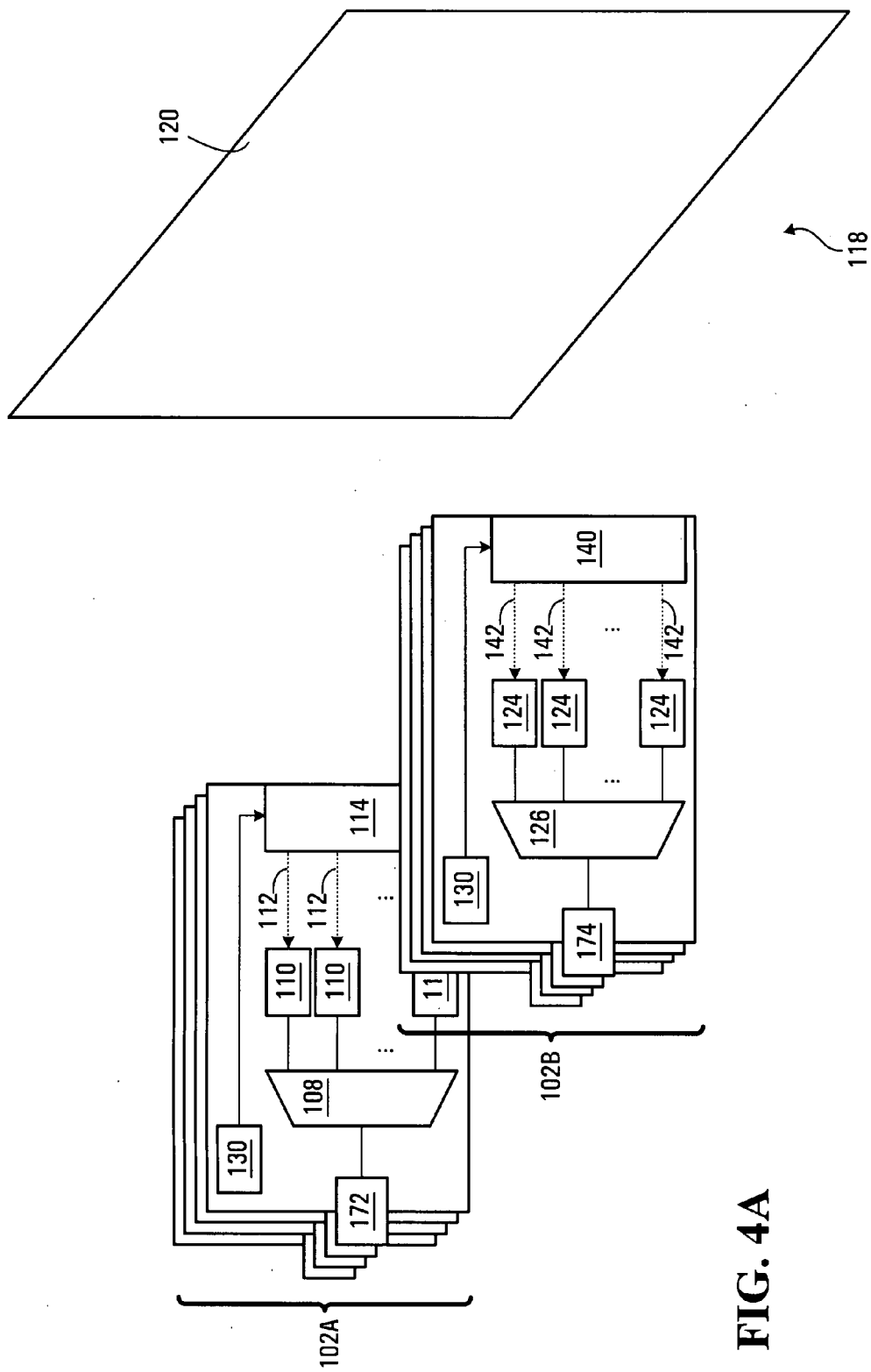
FIGS. 4A-4C are, respectively, perspective, side elevational and plan views of an apparatus for switching optical signals in accordance with an embodiment of the present invention.
Figure 4B:
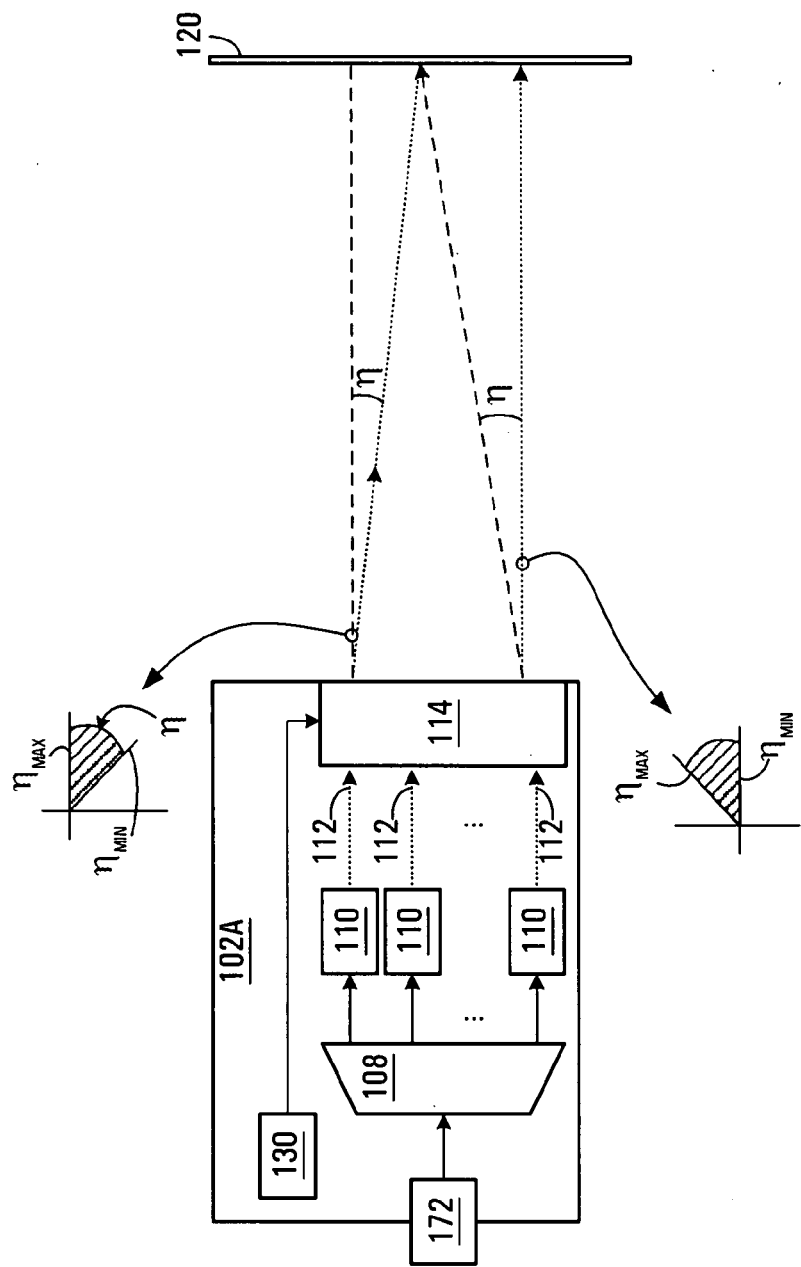

Fortunately, it is possible to reduce this ineffective use of potential range of horizontal deflection angle. Specifically, as shown in FIGS. 3A-3C, an apparatus hereinafter referred to as a "prism plate" 300 can be introduced between the transmit port cards 102A and the reflector 120. The prism plate 300 has a number of refractive facetted vertical strips 302, each associated with a different one of the transmit port cards 102A. The vertical strips 302 may be coated with an anti-reflective material (or multiple layers of anti-reflective materials, each layer being of the order of (2n+1)/4 wavelengths thick at the center of the optical frequency band of interest, where n is an integer, usually 0,1 or 2 but not limited to those values) covering the wavelengths of interest, such as (but not limited to) 1500 nm to 1600 nm or a subset thereof.

Each of the vertical strips 302 presents a face having an angle relative to the general horizontal direction, which is a function of the position (along the horizontal direction) of the associated transmit port card 102A, in addition to being a function of the refractive index of the material of the prism plate 300, the physical geometry of the reflector 120 (planar mirror or otherwise), the total number of transmit port cards 102A and the pitch, i.e., the spacing between the transmit port cards 102A. This will translate into a right or left bias Δα for each given vertical strip 302 that depends on the horizontal position of the transmit port card 102A associated with the given vertical strip 302. More specifically, the transmitter elements 110 can be viewed as defining a two-dimensional array, i.e., in the horizontal and vertical directions. The transmitter elements 110 on a given transmit port card 102A share the same horizontal position. Each vertical strip 302 will thus provide the same horizontal bias for the optical beams 112 emitted by the transmitter elements 110 sharing the same horizontal position, i.e., which are on the same transmit port card 102A.

It will thus be appreciated that with the use of the prism plate 300, it is not necessary to over-provision the beam steering elements of the transmit beam steering element array 114 on the various transmit port cards 102A to provide a larger-than-necessary range of potential horizontal deflection angles α. Rather, the available range of potential horizontal deflection angles α will always be directed towards the optical chamber 118 by the prism plate 300. This has the advantage of allowing a reduction in both the optical path length and the depth of the free-space optical chamber 118, as well as allowing a reduction in the required pointing precision for the oriented optical beams 116 emanating from the transmit beam steering element array 114 to impinge on the desired beam steering element of the receive beam steering element array 140.

With reference now to FIG. 2B, it will also be apparent that the vertical deflection angle η may range from a minimum vertical deflection angle $η_{MIN}$ (when a northernmost optical transmitter element 110 sends an oriented optical beam 116 to a southernmost receiver element 110 on any receive port card 102B) to a maximum vertical deflection angle $η_{MAX}$ close to zero (when a southernmost optical transmitter element 110 sends an oriented optical beam 116 to a northernmost receiver element 110 on any receive port card 102B). In fact, each of the optical transmitter elements 110 on a given transmit port card 102A has its own range of potential vertical deflection angles η, delending on the vertical position of each optical transmitter element 110 on the given transmit port card 102A, although there is no dependence on the horizontal position of the given transmit port card 102A within the card cage.

Because there is no dependency of the range of potential vertical deflection angles η on the horizontal position of a given transmit port card 102A in the card cage, it may be of advantage to bias each optical transmitter element 110 "downwards" at all times, so as to point generally towards the image of a optical receive element 124 somewhere in the lower half of the switch 100. This will translate into a downward vertical bias for each optical transmitter element 110 that depends on the relative vertical position of that optical transmitter element 110. This downward vertical bias can be achieved in a variety of ways, some of which are now described.

In a first example, the downward vertical bias can be achieved by the control module 130 providing a bias drive voltage to the beam steering elements in the transmit beam steering element array 114. The bias drive voltage can be such that the optical beam 112 emanating from each optical transmitter element 110 is steered via the reflector 120 towards an existing or fictitious beam steering element corresponding to an optical receive element 124 that is located midway between the uppermost and lowermost optical receive elements 124. The bias drive voltage is then varied differentially (i.e., increased or reduced slightly) during actual operation so as to point to an actual beam steering element corresponding to the target optical receive element 124 specific in the switching instructions. However, this solution has the detrimental side-effect of eroding the useful deflection range of the beam steering elements (typically MEMS switch mirrors with +/−5-7 degrees of mechanical movement) in a manner similar to that described before.

Figure 3D:
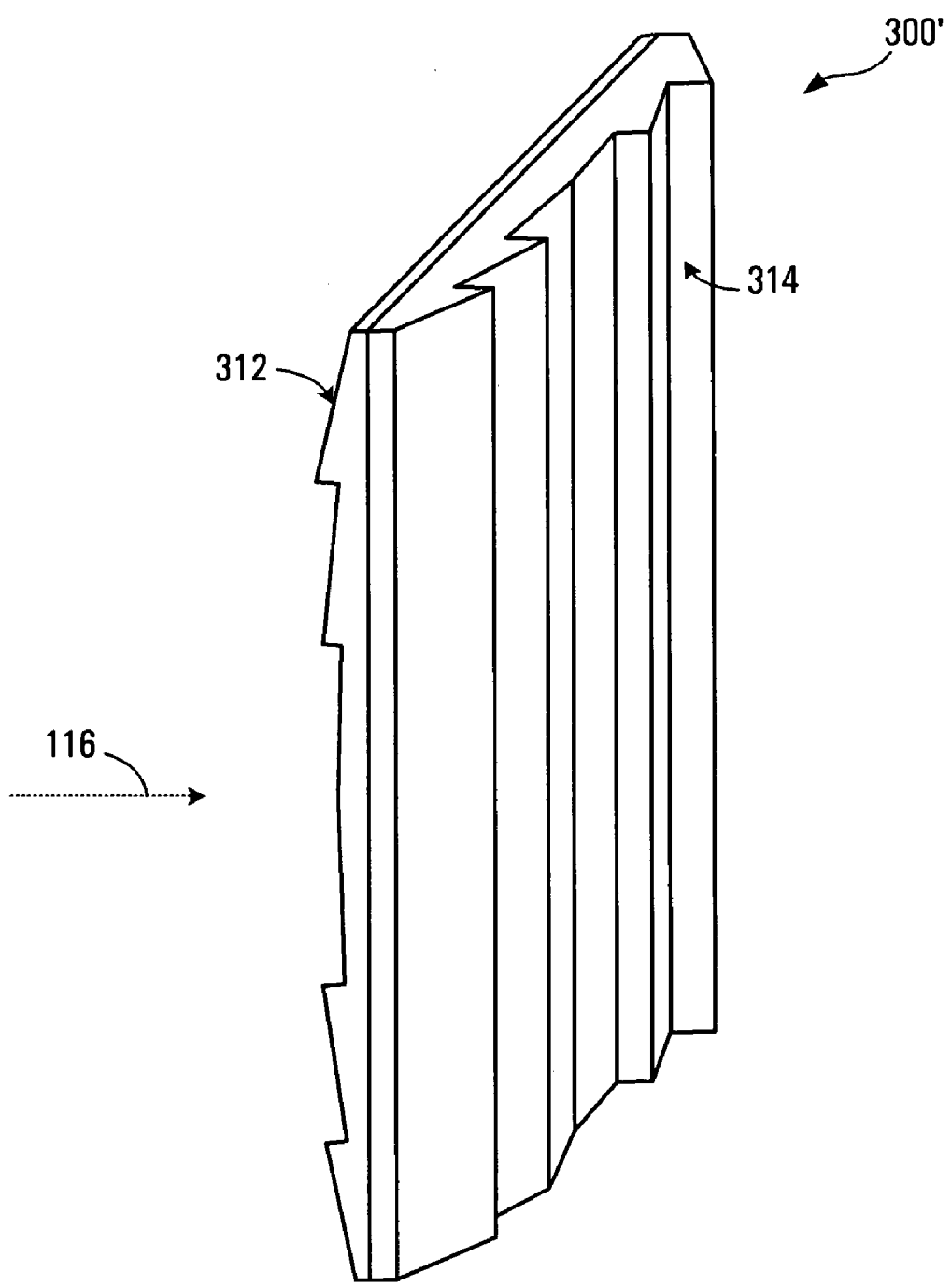
FIG. 3D is a perspective view of a dual faceted prism plate in accordance with an embodiment of the present invention.

Alternatively, as shown in FIG. 3D, the desired downward vertical bias can be achieved by providing refraction at the output of the optical transmitter elements 110. Specifically, a modified prism plate 300' (which already provides the requisite horizontal bias, described above) additionally introduces a variable vertical bias, being downward for the upper half of the shelf and, depending on operation requirements, upward for the lower half of the shelf. This can be achieved by providing vertical strips (providing horizontal bias) on one surface of the prism plate and horizontal prism facets (providing vertical bias) on the other surface. In an alternative embodiment to the one illustrated in FIG. 3D, the same side of the prism plate provides both a horizontal bias and a vertical bias. In yet another embodiment, two prism plates could be placed in series, one providing the horizontal bias and one providing the vertical bias. Alternatively, instead of the prism plates being implemented as rows of horizontal and vertical prisms, more complex structures and facet angles with both varying horizontal and vertical components could be used on one or both surfaces, creating a two-dimensional array of angled prism facets on each surface of the prism plate. This would allow for an increased level of deflection from the prism plate.

Figure 3E:
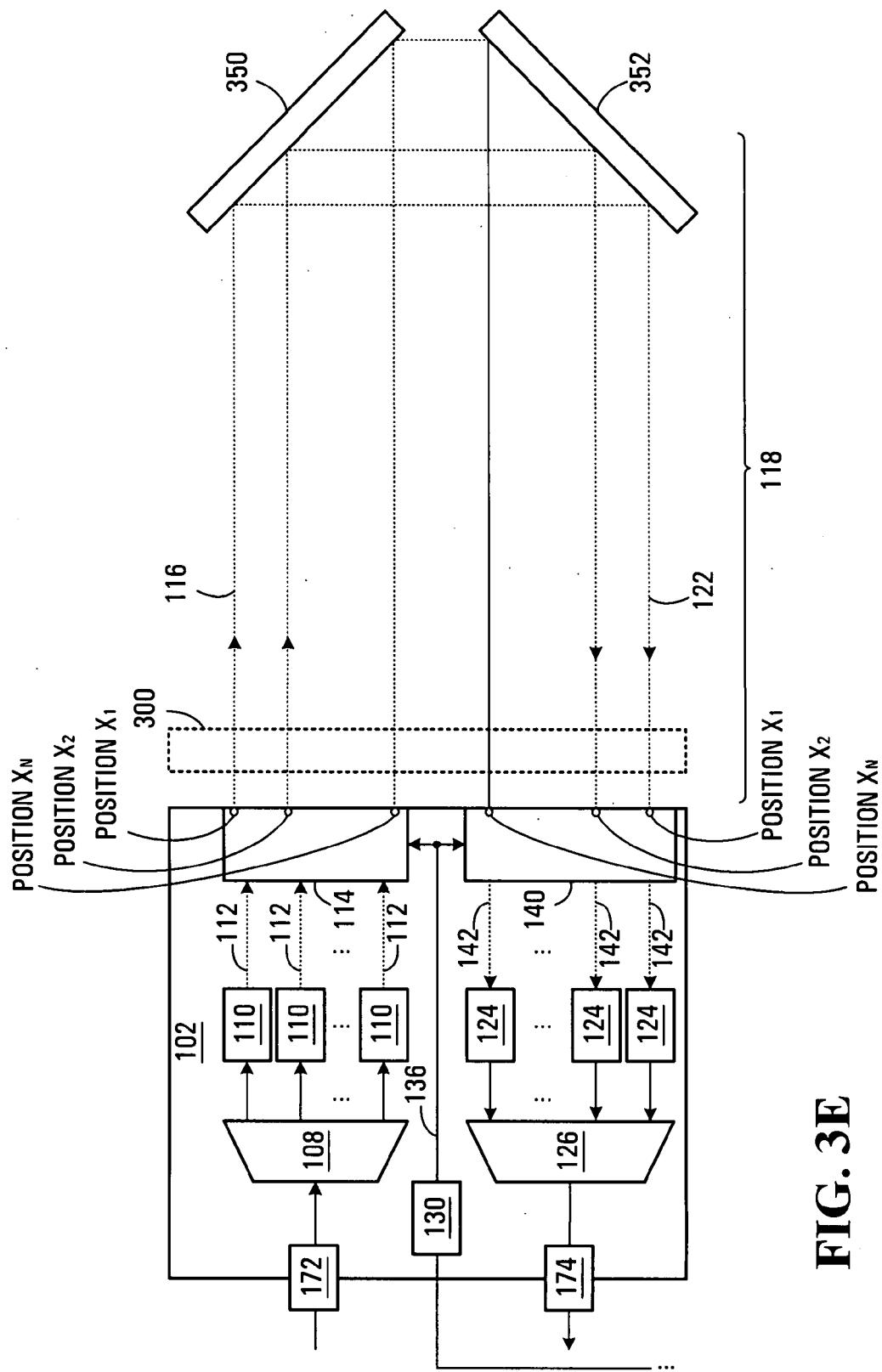
FIG. 3E is side elevational view of an apparatus for switching optical signals in accordance with an embodiment of the present invention, comprising a pair of reflective surfaces.

In yet another embodiment, shown in FIG. 3E, the desired vertical bias can be provided by splitting the reflector 120 into a pair of planar mirrors 320, 322 that act in a "periscope" fashion. In a specific embodiment, the reflective surfaces of the planar mirrors 320, 322 may be perpendicular to one another. This setup further helps to reduce the depth of the optical chamber 118. Also, this embodiment is particularly advantageous where there is a pre-determined constant relationship between the vertical positions of all optical transmitter elements 110 and all optical receive elements 124, i.e., when switching occurs only in the horizontal direction. For example, such a constraint may be in effect when different beams of received monochromatic light are being demultiplexed and re-multiplexed at the port cards. In such cases, the receive port cards 102B may be designed such that an optical receive element 124 can only receive same-colored light which means light from optical transmitter elements 110 occupying a common position in the vertical direction on any given transmit port card 102A. The use of planar mirrors 320, 322 effectively results in an inversion in the order in which colors are distributed in a vertical direction, between the optical transmitter elements 110 on one hand and the optical receive elements 124 on the other. Under these circumstances, the backplane mirror periscope structure of FIG. 3E provides the requisite vertical translation.

In the embodiments of FIGS. 2A-2C and FIGS. 3A-3E described above, each of the port cards 102A, 102B possesses both transmit and receive functionality. However, when the transmit port cards 102A are distinct from the receive port cards 102B, then the transmit port cards 102A and the receive port cards 102B can be interleaved while in other specific embodiments, for example with reference to FIGS. 4A-4C, the transmit port cards 102A are located generally towards one side (in this case the leftmost side of the card cage) and the receive port cards 102B can be located generally towards the other side. It is also noted that when the transmit port cards 102A are distinct from the receive port cards 102B then, as best shown in FIG. 4D, the transmit port cards 102A and the receive port cards 102B can be separated from one another by a one or more other cards 420 or empty slots, which can be used for control purposes or future expansion.

As before, a horizontal deflection angle α and a vertical deflection angle η for each oriented optical beam 116 emanating from a particular transmit port card 102A is provided by the beam steering elements of the corresponding transmit beam steering element array 114 on that transmit port card 102A. The oriented optical beam 116 then reflects off of the reflector 120 towards the appropriate receiver 124 on the appropriate receive port card 102B via the appropriate beam steering element of the receive beam steering element array 140 on that receive port card 102B.

Figure 4C:
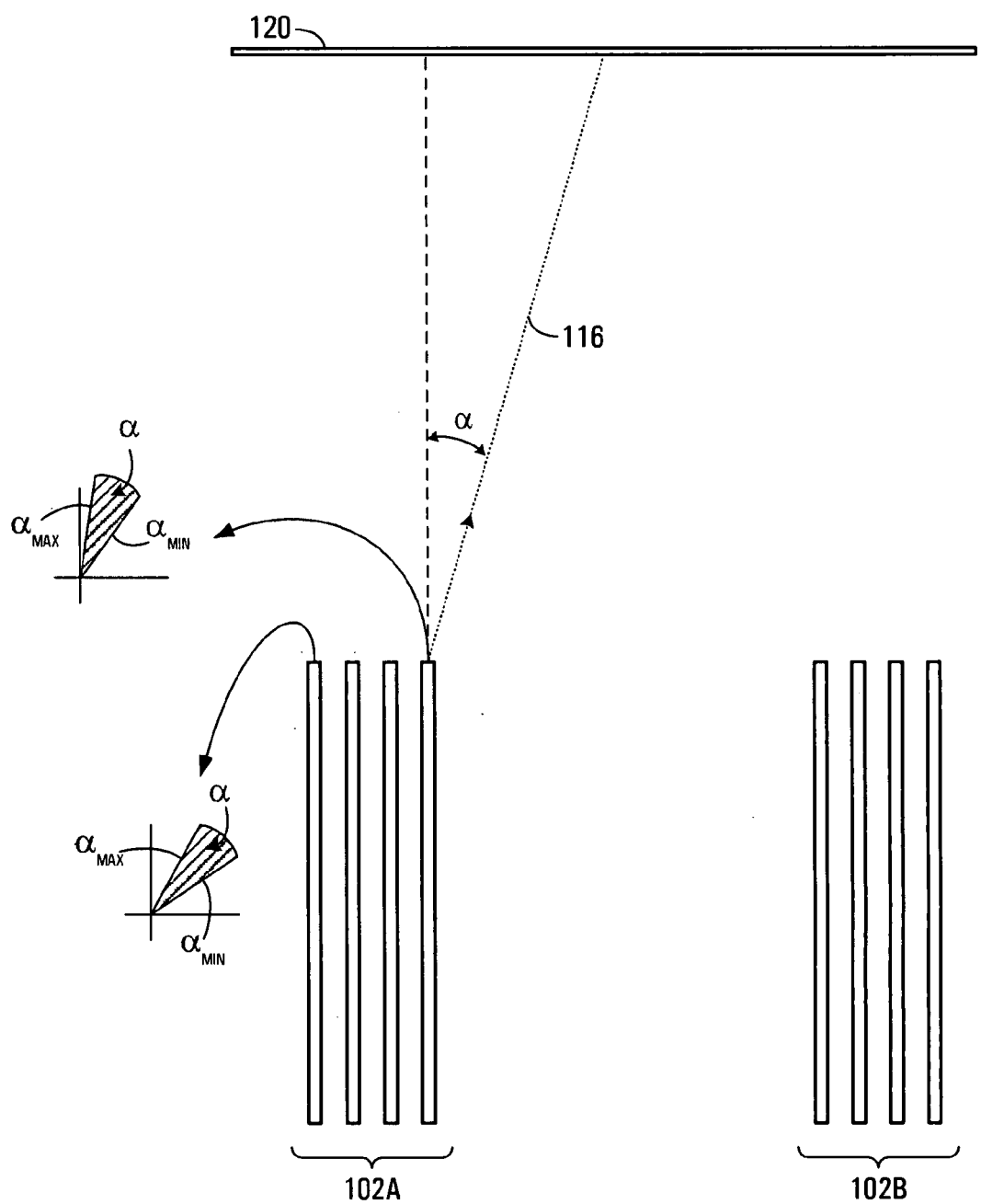
Figure 4D:
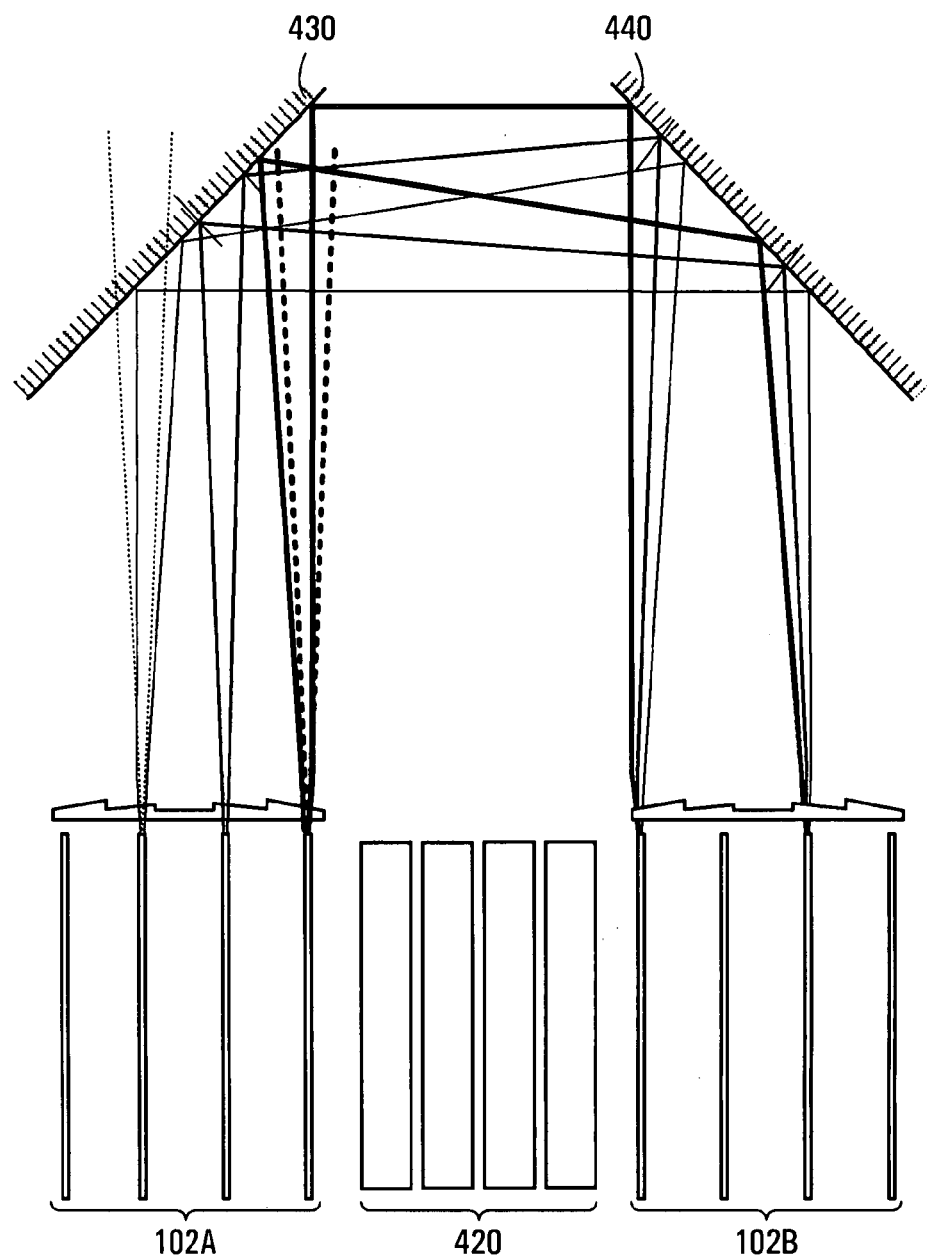
FIG. 4D is a plan view of a switch for optical signals in accordance with an embodiment of the present invention, comprising a reflector with a pair of reflective surfaces.

From FIG. 4C, it will be apparent that the horizontal deflection angle α may range from a minimum horizontal deflection angle $\alpha_{MIN}$ (when a optical transmitter element 110 on the leftmost of the transmit port cards 102A sends an oriented optical beam 116 to the rightmost of the receive port cards 102B) to a maximum horizontal deflection angle $\alpha_{MAX}$ close to zero (when an optical transmitter element 110 on the rightmost one of the transmit port cards 102A sends an oriented optical beam 116 to the leftmost of the receive port cards 102B). In fact, each of the port cards 102A has its own range of potential horizonal deflection angles α, which will be different for transmit port cards 102A occupying different slots in the card cage.

In a design where the transmit port cards 102A are designed to be interchangeable, all of the transmit port cards 102A would ideally to have the same capabilities of deflection. Therefore, in the design of FIGS. 4A-4C, where all transmit port cards 102A are identical and where the range of potential horizontal deflection angles is symmetric about zero and designed to account for the worst-case scenario, there will be erosion of a significant percentage of the available range of potential horizontal deflection angles α.

Now, recalling that with current deflection technologies such as MEMS, deflection angle is a scarce commodity, it is possible to pre-orient each optical transmitter element 110, so as to point in a direction that corresponds to the image of a beam steering element on an imaginary receive port card located midway between the rightmost and leftmost ones of the receive port cards 102B. This will translate into a rightward bias for the optical transmitter elements 110 on each of the transmit port cards 102A that depends on the horizontal position of that transmit port card 102A within the card cage. This rightward bias can be achieved by providing a prism plate (not shown) at the output of the transmit beam steering element arrays 114 of the various transmit port cards 102A, in a manner similar to that described above with reference to the embodiment of FIGS. 3A-3C.

As before, the use of such a prism plate allows one to forego over-provisioning the transmit beam steering element array 114 on each transmit port card 102A to provide a larger-than-necessary range of potential horizontal deflection angles α. Moreover, due to the effect of the prism plate, the full range of potential horizontal deflection angles α of all the transmit port cards 102A will remain inside the optical chamber 118, allowing the optical path length and the chamber depth to be reduced. The path length and the chamber depth can be even further reduced by extending the prism plate to provide refraction of the received optical beams 122 (received via the reflector 120) towards the beam steering elements on the receive port cards 102B. As an alternative, which allows the use of less powerful prism plates or even eliminates the need for such prism plates, one can use a horizontal periscope setup as shown in FIG. 4D. Specifically, a pair of planar reflective surfaces 430, 440 are provided at the back of the optical chamber 118 are serve to provide a horizontal bias to the oriented optical beams 116 sent by the transmit port cards 102A.

Returning now to FIG. 4B, it will also be apparent that the vertical deflection angle η may range from a minimum vertical deflection angle $\eta_{MIN}$ (when an uppermost optical transmitter element 110 sends an oriented optical beam 116 to a lowermost optical receive element 124) to a maximum vertical deflection angle $\eta_{MAX}$ (when a lowermost optical transmitter element 110 sends an oriented optical beam 116 to an uppermost optical receive element 124). In fact, each of the optical transmitter elements 110 has its own range of potential vertical deflection angles η, which will be different for optical transmitter elements 110 at different vertical positions, but will not vary amongst the transmit port cards 102A. For example, a optical transmitter element 110 located mid-way between the upper and lower extremes has a range of potential vertical deflection angles η that is symmetric about zero, while a lowermost optical transmitter element 110 has a range of potential vertical deflection angles η that is entirely upwards, and an uppermost optical transmitter element 110 has a range of potential vertical deflection angles η that is entirely downward. In this way, it is seen that the optical transmitter elements 110 will be left unable to exploit about half of their range of potential vertical deflection angles η.

However, it is possible to harness the unused portion of the range of potential vertical deflection angles η of the optical transmitter elements 110. Specifically, a second prism plate (not shown, but similar to the prism plate 300' of FIG. 3D) can be introduced between the transmit port cards 102A and the reflector 120. The second prism plate will have a number of refractive facetted horizontal strips (similar to the strips 312), each associated with an optical transmitter element 110 in a different position along the vertical direction. The horizontal strips of the second prism plate may comprise one or more coatings of anti-reflective material covering the wavelengths of interest, such as 1500 nm to 1600 nm or a subset thereof. Each of the horizontal strips has an angle relative to the general vertical direction, which is a function of the vertical position of the associated optical transmitter element 110, in addition to being a function of the refractive index of the material of the second prism plate, the physical geometry of the reflector 120 (planar mirror or otherwise), the total number of optical receive elements 124 and the spacing therebetween. This will translate into a vertical bias for each of the optical transmitter elements 110 that depends on the vertical position of that optical transmitter element 110.

It will thus be appreciated that with the use of the second prism plate, the full range of potential vertical deflection angles η of all the optical transmitter elements 110 will be utilized, allowing the optical path length and the chamber depth to be reduced. Also, it should be noted that the first and second prism plates can be placed one in front of the other, or they can be integrated to form a single composite prism plate, similar to the prism plate 300' of FIG. 3D, but adapted to account for the new geometry which separates the transmit port cards 102A from the receive port cards 102B.

The reflector 120 is now described in greater detail. The configuration of the reflector 120 has an influence on the depth of the optical chamber 118 as well as on the precise direction in which the transmit beam steering element array 114 must send the oriented optical beams 116 in order for them to reach their intended optical receive element 124, as specified in the switching instructions. For example, the complete absence of a reflector is one possibility, where the transmit port cards 102A and the receive port cards 102B face one another at opposite ends of a optical chamber 118. However, the depth of the optical chamber 118 is greater than in the presence of a reflector 120.

Figure 5A:
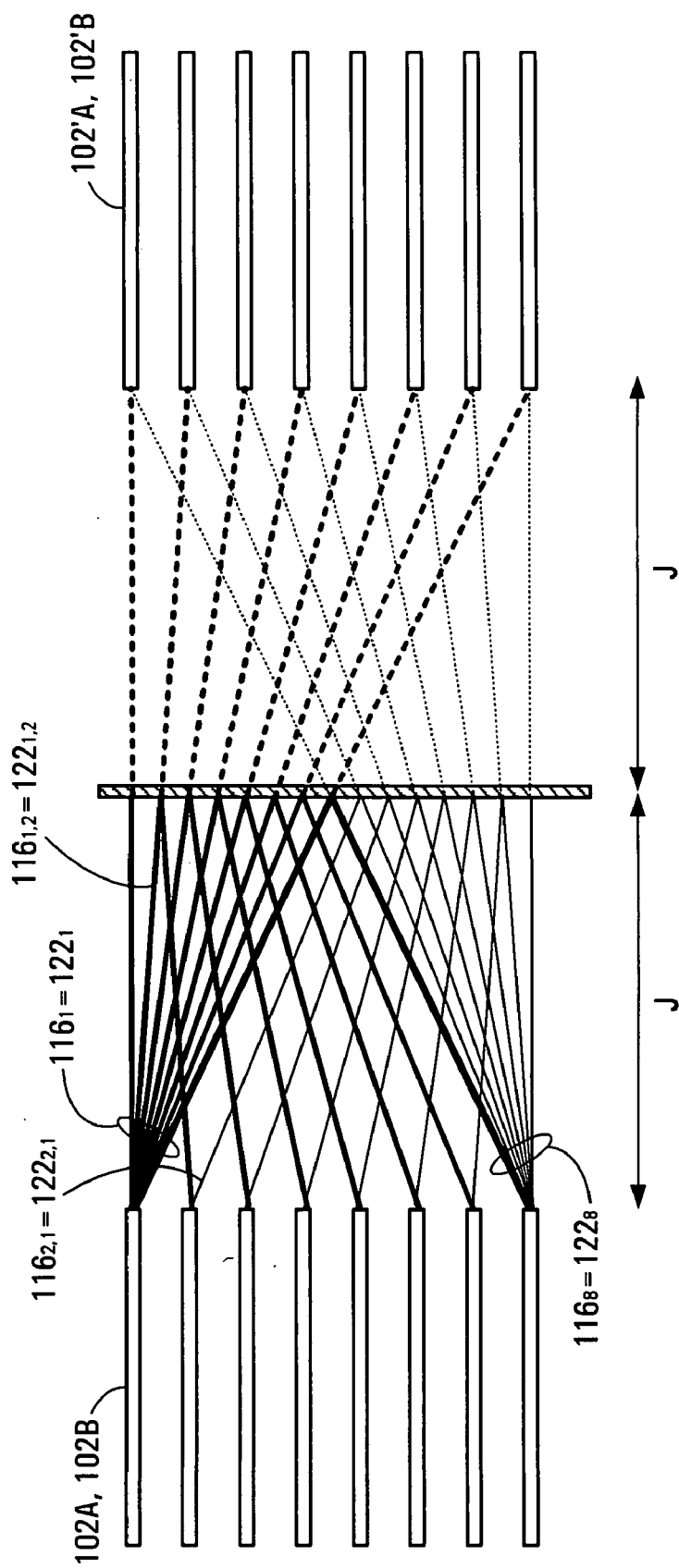
FIG. 5A is a plan view of an apparatus for switching optical signals in accordance with an embodiment of the present invention, comprising a reflector with a planar surface.

When a reflector 120 is used, such may be planar or non-planar in nature. With reference to FIG. 5A, there is shown a planar mirror 502 in plan view. The beam steering elements of the receive beam steering element arrays 140 are associated with virtual images that are "behind" the planar mirror 502, and represent the points towards which the beam steering elements of each transmit beam steering element array 114 should aim when attempting to reach an actual target beam steering element. The target beam steering element and its image are equally far from the planar mirror 502, and are of the same size.

Figure 5B:
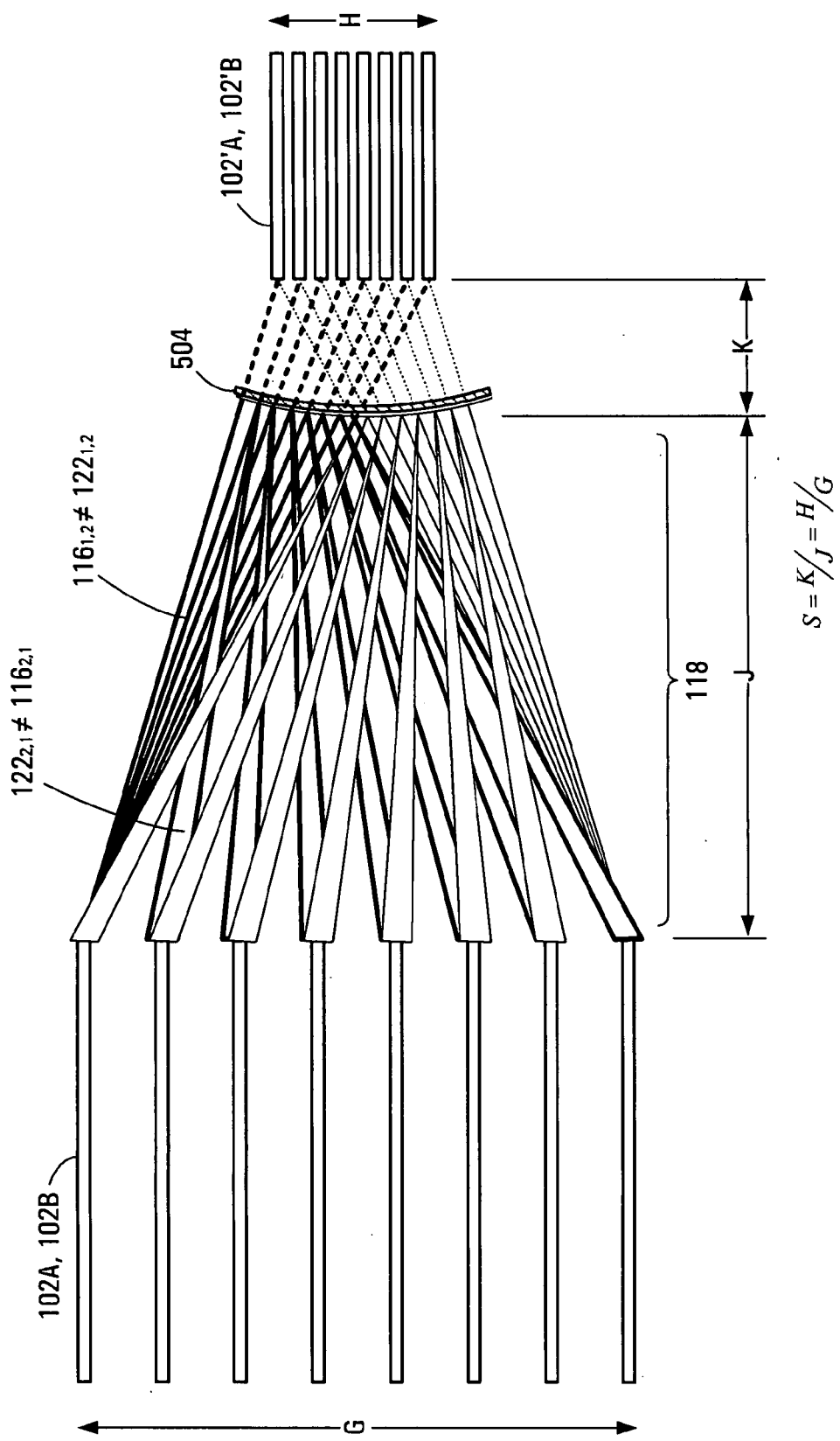
FIG. 5B is a plan view of an apparatus for switching optical signals in accordance with an embodiment of the present invention, comprising a reflector with a curved surface.
Figure 5D:
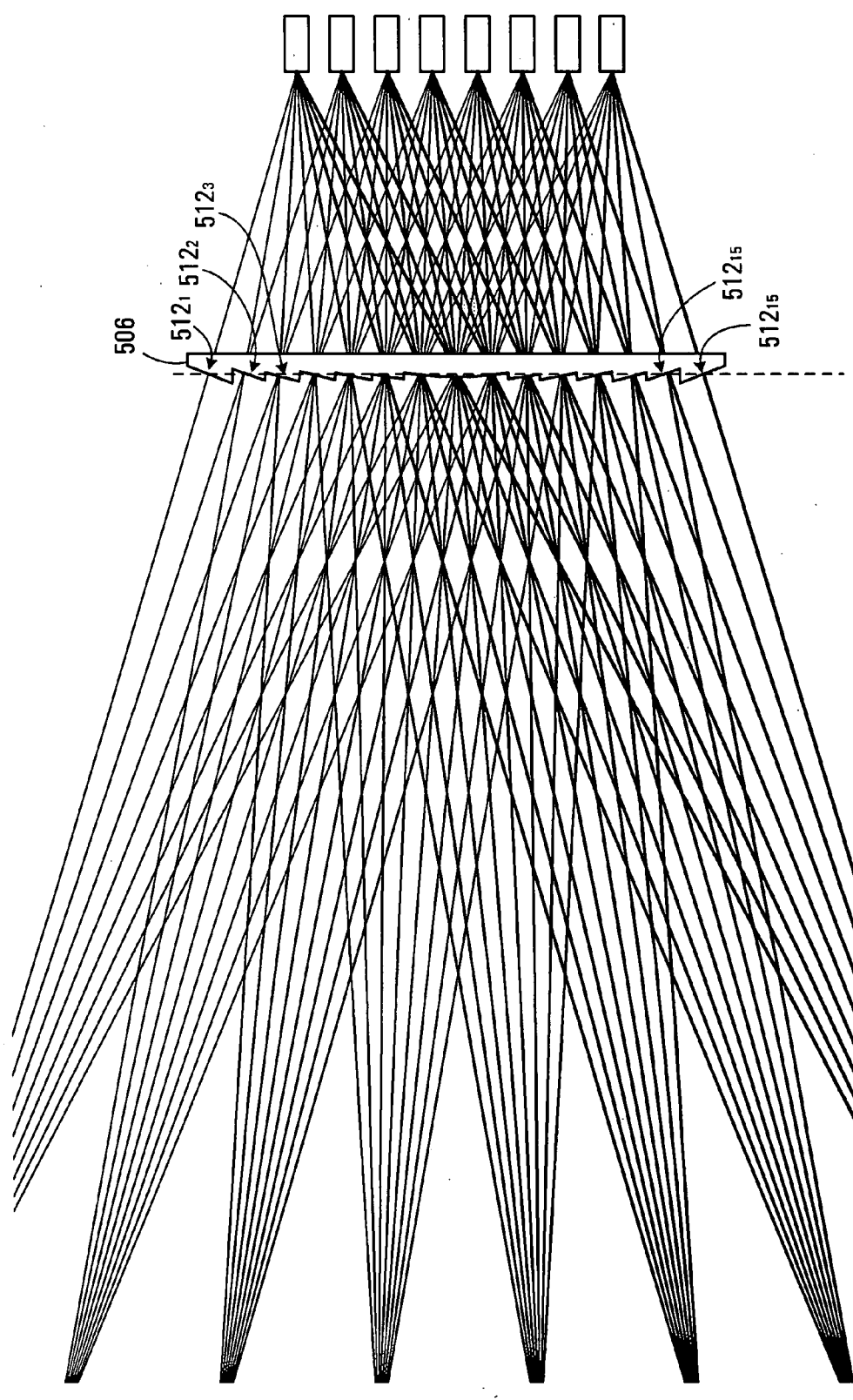
FIG. 5D is a more detailed depiction of the reflector of FIG. 5C.

Now with reference to FIG. 5B, consider the case of a convex mirror 504, smaller in size than the planar mirror 502, placed at the back of the optical chamber 118 in place of the original planar mirror 502. The use of the convex mirror 504 gives rise to a smaller virtual image, which is located closer to the convex mirror 504 than the originating object, the ratio of image magnification and front/back distances being equal. Hence, for a magnification of S (where S<1), the ratio of front-back distances is S:1 and the ratio of the size of the image vis-à-vis the original is S:1. It can thus be shown that the ratio of the overall path length to the image is (1+S):2 when compared with the case of the planar mirror 502, which means that the distance to the convex mirror 504 can be reduced by a factor of (2*S/(1+S)):1. Alternatively, if the distance to the convex mirror 504 is kept constant, then the arctangent of this ratio represents the available reduction in the total horizontal deflection angle range, although it is noted that stronger horizontal bias by a prism plate would be needed with this approach.

One side-effect from the convex mirror 504 approach of FIG. 5B, is that the curvature of the surface of the convex mirror 504 will cause an astigmatic distortion, leading to an expansion (dispersion) of the optical beams 122 leaving the convex mirror 504. This can be overcome by the solution in FIG. 5C, which shows an alternative to both the planar mirror 502 and the convex mirror 504, namely the use of a facetted backplane mirror 506. Specifically, the facetted backplane mirror 506 comprises planar vertical facets 512 that have increasingly acute angles as the horizontal distance from the center of the facetted backplane mirror 506 increases. In a specific embodiment, the number of planar vertical facets 512 used to support a number (P) of port cards acting as both transmit and receive port cards is 2P−1. The facets can be designed so as to lie in a flat plane at a specific points determined by the magnification factor (S) required, but with the facet angles matching those of a curved mirror giving the same value of S. This gives the same benefit of the convex mirror 504, namely a smaller deflection angle or a reduced chamber depth. However, because the facets 512 are planar, there will be no distortion of the received optical beams 122, provided that each oriented optical beam 116 impinges upon only one of the facets 512 at any given time.

An example of how to design the facetted backplane 506 for a desired image/object ratio of S (which is equal to H/G or J/K) is now described. The 2P−1 facets 512 are denoted $512_1, 512_2, \ldots, 512_{2P-1}$, while the P port cards are denoted $102_1, 102_2, \ldots, 102_P$. Facet $512_1$ interconnects only one port card to itself, namely $102_1$. Facet $512_2$ interconnects two port cards, namely port card $102_1$ and port cards $102_2$. Facet $512_3$ intercepts port card $102_2$ to itself, as well as port $102_1$ to $102_3$. This pattern continues, until one reaches the central (i.e., $P^{th}$) facet $512_P$, which intercepts some connections from all port cards. Beyond this point, the number of port cards interconnected decreases until, at facet $512_{2P-2}$, where just port cards $102_{P-1}$ and $102_P$. In the case of a switch 100 with eight (P=8) port cards, as is shown in FIG. 5C, this leads to:

| Facet # | Port Cards Interconnected |
|---|---|
| $512_1$ | $102_1 \leftrightarrow 102_1$ |
| $512_2$ | $102_1 \leftrightarrow 102_2$ |
| $512_3$ | $102_1 \leftrightarrow 102_3, 102_2 \leftrightarrow 102_2$ |
| $512_4$ | $102_1 \leftrightarrow 102_4, 102_2 \leftrightarrow 102_3$ |
| $512_5$ | $102_1 \leftrightarrow 102_5, 102_2 \leftrightarrow 102_4, 102_3 \leftrightarrow 102_3$ |
| $512_6$ | $102_1 \leftrightarrow 102_6, 102_2 \leftrightarrow 102_5, 102_3 \leftrightarrow 102_4$ |
| $512_7$ | $102_1 \leftrightarrow 102_7, 102_2 \leftrightarrow 102_6, 102_3 \leftrightarrow 102_5, 102_4 \leftrightarrow 102_4$ |
| $512_8$ | $102_1 \leftrightarrow 102_8, 102_2 \leftrightarrow 102_7, 102_3 \leftrightarrow 102_6, 102_4 \leftrightarrow 102_5$ |
| $512_9$ | $102_2 \leftrightarrow 102_8, 102_7 \leftrightarrow 102_3, 102_6 \leftrightarrow 102_4, 102_5 \leftrightarrow 102_5$ |
| $512_{10}$ | $102_3 \leftrightarrow 102_8, 102_7 \leftrightarrow 102_4, 102_6 \leftrightarrow 102_5$ |
| $512_{11}$ | $102_4 \leftrightarrow 102_8, 102_7 \leftrightarrow 102_5, 102_6 \leftrightarrow 102_6$ |
| $512_{12}$ | $102_5 \leftrightarrow 102_8, 102_7 \leftrightarrow 102_6$ |
| $512_{13}$ | $102_6 \leftrightarrow 102_8, 102_7 \leftrightarrow 102_7$ |
| $512_{14}$ | $102_7 \leftrightarrow 102_8$ |
| $512_{15}$ | $102_8 \leftrightarrow 102_8$ |

In accordance with the above, and as can be seen from FIG. 5C, every second facet returns light from a port card back to that port card. Thus, facet $512_1$ is in a plane perpendicular to a line from port card $102_1$ to the center of facet $512_1$, facet $512_2$ is in a plane perpendicular to the bisect of the angle formed at that facet between lines from port cards $102_1$ and $102_2$, facet $512_3$ is in a plane perpendicular to a line from port card $102_2$ to the center of facet $512_3$, facet $512_4$ is in a plane perpendicular to the bisect of the angle formed at that facet between lines from port cards $102_1$ and $102_4$, etc.

Figure 7A:
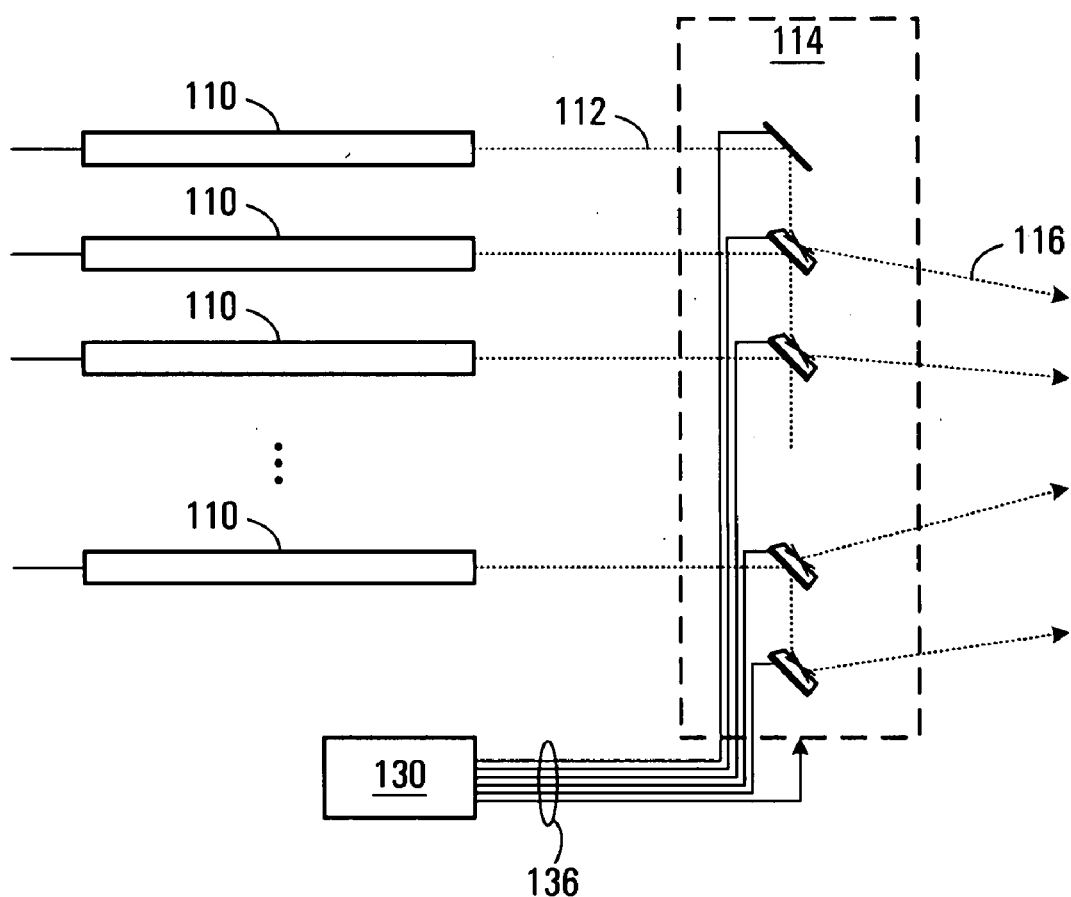
FIG. 7A is a block diagram of a transmit beam steering element array in accordance with an embodiment of the present invention.

As previously mentioned, the transmit beam steering element array 114 on a given transmit port card 102A is responsible for deflecting the optical beams 112 into oriented optical beams 116, causing the latter to acquire a desired direction towards the reflector 120 (if used). It is noted that the optical beams 112 deflected by the transmit beam steering element array 114 are closely spaced and arrive in parallel at the transmit beam steering element array 114 from the optical transmitter elements 110. FIG. 7A shows generally how deflection is achieved while FIGS. 7B through 7G show various embodiments of the transmit beam steering element array 114. As can be appreciated from FIG. 7A and the description to follow, a common feature of each of configurations in FIGS. 7B through 7G is that a plurality of points of deflection are provided for each of the optical beams 112. It will be appreciated that a similar design can be used in the receive beam steering element array 140 on each receive port card 102B. It is recalled that the receive beam steering element array 140 redirects the received optical beams 122 into deflected optical beams 142 that impinge on the optical receive elements 124.

Figures 7B, 7C, 7D, 7E, 7F, 7G:
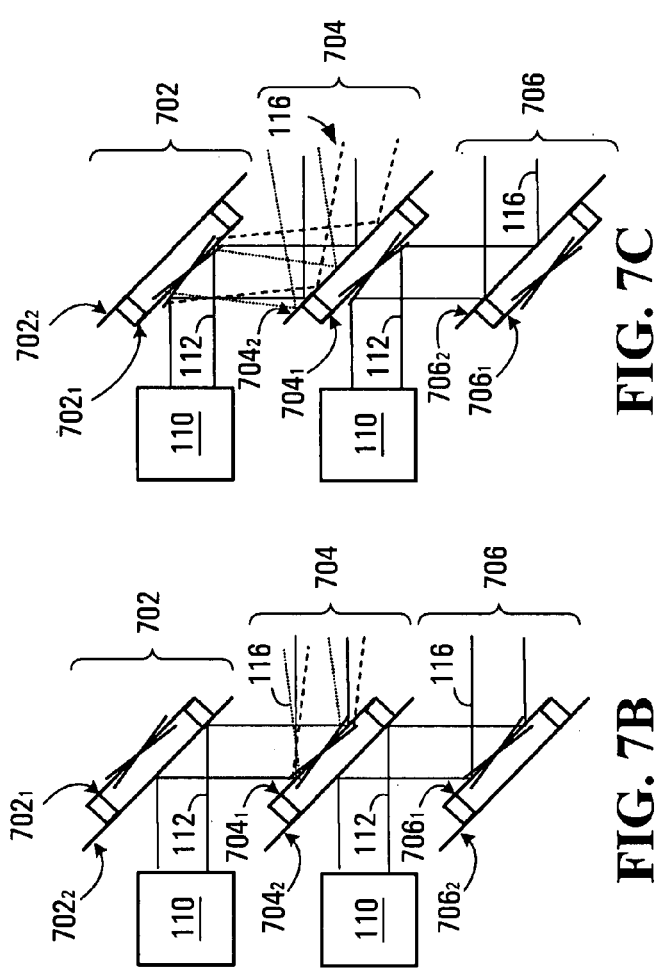
FIG. 7B is a side elevational view of an arrangement of beam steering elements in the transmit beam steering element array of FIG. 7A.
FIGS. 7C and 7D are variants of FIG. 7B.
FIG. 7E is a plan view of an arrangement of beam steering elements in the transmit beam steering element array of FIG. 7A.
FIGS. 7F and 7G are variants of FIG. 7E.

With specific reference to FIG. 7B, there is shown a portion of a first example embodiment of the transmit beam steering element array 114 on a particular transmit port card 102A, with the substrate of the transmit port card 102A being in the plane of the page. Specifically, the optical transmitter elements 110 produce a plurality of optical beams 112 which impinge on a column of beam steering elements 702, 704, 706. The beam steering elements 702, 704, 706 each comprise a respective first, movable reflective facet $702_1$, $704_1$, $706_1$. The beam steering elements 702, 704, 706 also each comprise a respective second, non-movable reflective facet $702_2$, $704_2$, $706_2$, which may be provided in a specific non-limiting example embodiment by a reflectively coated back wall of an enclosure. Contrary to the first reflective facet $702_1$, $704_1$, $706_1$ of each of the beam steering elements 702, 704, 706, which has a controllable deflection angle, the deflection angle of the second reflective facets $702_2$, $704_2$, $706_2$ is fixed. Of course, it should be understood that the second reflective facets $702_2$, $704_2$, $706_2$ may be provided as stand-alone mirrors not having any connection to the first reflective facets $702_1$, $704_1$, $706_1$.

As previously described, the transmit beam steering element array 114 provides at least two points of deflection for each of the optical beams 112, as emitted by the optical transmitter elements 110 on the particular transmit port card 102A of interest. In the specific embodiment of FIG. 7B, the second reflective facet $702_2$ of beam steering element 702 is fixed in a position where it intercepts the optical beam 112 emitted by a corresponding one of the optical transmitter elements 110 and deflects it towards the first reflective facet $704_1$ of beam steering element 704. Similarly, the second reflective facet $704_2$ of beam steering element 704 is fixed in a position where it intercepts the optical beam 112 emitted by another one of the optical transmitter elements 110 and deflects it towards the first reflective facet $706_1$ of beam steering element 706. Beam steering in two axes (vertical deviations from the horizontal direction in the plane of the drawing and perpendicular to the drawing) is provided by the first reflective facets $702_1$, $704_1$, $706_1$, which in fact deliver the second of two points of deflection for each of the resultant optical beams 112, resulting in the oriented optical beams 116.

With reference now to FIG. 7C, there is shown a portion of a second example embodiment of a transmit beam steering element array 114 on a particular transmit port card 102A, again with the substrate of the transmit port card 102A being in the plane of the page. This embodiment is similar to the one in FIG. 7B, except that the beam steering elements 702, 704, 706 are inverted. Thus, the transmit beam steering element array 114 continues to provide at least two points of deflection for each of the optical beams 112 emitted by the optical transmitter elements 110 on the transmit port card 102A. However, in the specific embodiment of FIG. 7C, the first reflective facet $702_1$ of beam steering element 702, which has a controllable deflection angle, is positioned so as to intercept the optical beam 112 emitted by a corresponding one of the optical transmitter elements 110 and to controllably deflect it towards the second reflective facet $704_2$ of beam steering element 704. Similarly, the first reflective facet $704_1$ of beam steering element 704 intercepts the optical beam 112 emitted by another one of the optical transmitter elements 110 and controllably deflects it towards the second reflective facet $706_2$ of beam steering element 706. Beam steering is again provided by the first reflective facets $702_1$, $704_1$, $706_1$, but which in this case deliver the first (rather than the second) of two points of deflection for each of the optical beams 112, resulting in the oriented optical beams 116. While it is clear that the total range of deflection angles is the same in the embodiment of FIG. 7C, the second reflective facets $702_2$, $704_2$, $706_2$ in the embodiment of FIG. 7C need to provide a reflective area that is slightly larger than the reflective area that needs to be provided in the embodiment of FIG. 7B.

In another embodiment, each of the optical beams 112 is deflected by two separate beam steering elements having independently controllable deflection angles. Specifically, having regard to FIG. 7D and again with the substrate of the transmit port card 102A being in the plane of the page, a back-to-back assembly is provided, whereby beam steering elements 702 and 703 each have a respective reflective first facet $702_1$, $703_1$ and are joined by a common second facet $702_2$, which need not be reflective. Similarly, beam steering elements 704 and 705 each have a respective reflective first facet $704_1$, $705_1$ and are joined by a common second facet $704_2$, while beam steering elements 706 and 707 each have a respective reflective first facet $706_1$, $707_1$ and are joined by a common second facet $706_2$. In another embodiment (not shown), there may be a separation between the second facet of each pair of back-to-back beam steering elements. In fact, the back facets of the various beam steering elements 702-707 are irrelevant to the optical path reflections in this particular embodiment.

Here again, the transmit beam steering element array 114 provides at least two points of deflection for each of the optical beams 112 emitted by the optical transmitter elements 110 on the transmit port card 102A. Specifically, the first reflective facet $702_1$, $703_1$, $704_1$, $705_1$, $706_1$, $707_1$ of each of the beam steering elements 702, 703, 704, 705, 706, 707 has a controllable deflection angle. Thus, the first reflective facet 7021 of beam steering element 702 is located such as to intercept the optical beam 112 emitted by a corresponding one of the optical transmitter elements 110 and to deflect it towards the first reflective facet $705_1$ of beam steering element 705. Similarly, the first reflective facet $704_1$ of beam steering element 704 is fixed in a position where it intercepts the optical beam 112 emitted by another one of the optical transmitter elements 110 and deflects it towards the first reflective facet $707_1$ of beam steering element 706. Beam steering is provided by each of the two reflective facets encountered by each of the optical beams 112, which affords a substantially increased total range of possible deflection angles, approximately doubling the maximum beam deflection when compared with the embodiments of FIGS. 7B and 7C.

FIGS. 7B-7D were presented with the plane of the substrate of the transmit port card 102A in the plane of the page. A further set of solutions is rendered possible by rotating the structures through 90 degrees relative to the substrate. These solutions are shown in FIGS. 7E-7G, where the transmit port card 102A is being viewed from above (i.e., plan view).

In FIGS. 7E and 7F, the beam steering element array 114 utilizes a strip mirror for at least one of the two deflections. Specifically, with reference to FIG. 7E, there is shown a plan view of an edge of a particular transmit port card 102A, with the uppermost optical transmitter element 110 being visible in the drawing, and producing an optical beam 112 underneath which there is an entire column of optical beams 112, effectively forming a parallel optical beam front. The optical beam front impinges upon a strip mirror 740, which deflects the optical beams 112 into deflected optical beams 742. The strip mirror 740 has a fixed deflection angle and may be formed of a single, monolithic piece of material. The deflected optical beams 742 each impinge upon an individual beam steering element 744, which has a reflective facet 746 with a controllable deflection angle. Thus, the transmit beam steering element array 114 provides two points of deflection for each of the optical beams 112 emitted by the optical transmitter elements 110 on the transmit port card 102A.

FIG. 7F shows a similar setup to that of FIG. 7E, except that the roles of the strip mirror 740 and the beam steering elements 744 have been reversed. Thus, the reflective facets 746 of the beam steering elements 744 provide the first deflection for each of the optical beams 112 in the optical beam front, while the second deflection is provided by the strip mirror 740. In this case, it is the angle of the first deflection, rather than the angle of the second deflection, which is controllable.

Yet another non-limiting example embodiment of the transmit beam steering element array 114 is shown in FIG. 7G, using two columns of individual beam steering elements 752, 754. The beam steering elements 752 comprise respective reflective facets $752_1$, $754_1$, which provide two independently controllable deflection angles for each of the optical beams 112. The combination of the two independently controllable deflective surfaces approximately doubles the achievable deflection angle, with a commensurate shortening of required optical path length, relative to the examples with single controlled deflection surfaces. However it also requires that the area of the second deflective surface be enlarged slightly.

The beam steering elements in the above-described examples of the transmit beam steering element array 114 can be implemented in many ways, one of which is now described with reference to FIG. 6. For convenience, the various beam steering elements, which took on reference numerals 702, 703, 704, 705, 706, 707, 752, 744, 752 and 754, will be hereinafter referred to under the numeral 600 in FIG. 6. The basic structure of the beam steering element 600 described below is similar to technologies such as part number ADN59102 or part number ADN59210 available from Analog Devices, Norwood, Mass., USA. However, other embodiments of the beam steering element 600 are possible, in which different mechanisms are used.

In this example implementation, not to be considered a limitation but rather an example of what can be achieved using readily available technologies, the beam steering element 600 comprises a 3-D MEMS mirror 602 linked to a housing via two sets of torsion members 604, 606 (for the X and Y directions, respectively). A set of four (4) quadrant electrodes 608 on a nearby substrate 610 underlies the back surface (not shown) of the mirror 602. The electrodes 608, which may be implemented as plates under the surface of the mirror 602, are driven with electrostatic drive voltages to cause the mirror 602 to move to a desired position in three-dimensional space against the tension of the torsion bar springs 604 linking the mirror 602 to the annulus and of the torsion bar springs 606 linking the annulus to the mirror surround. Specifically, the mirror 602 is activated by placing analog control voltages on each of the four electrodes 608 and exploiting electrostatic attraction to point the mirror 602 in a desired direction.

While it may be advantageous to have the substrate 610 close to the mirror 602 in order to achieve adequate deflection sensitivity without the use of inordinately high voltages, this proximity also limits the degree of deflection achievable with the mirror 602 before electrostatic attraction overcomes the torsion springs and the mirror "snaps-down" to make contact with the underlying electrode 608. In current designs "snap-down" (whereby the electrostatic attraction overpowers the torsion of the torsion bar spring in a non-linear manner) can occur beyond 5-7 degrees of mechanical deflection, by which point the drive voltages may be approaching 150 volts, although it is envisaged that in future designs, the range of deflection may be greater due to the use of improved mechanisms for steering the mirror 602.

As has been previously mentioned, the beam elements 600 in the transmit and receive beam steering element arrays 114, 140 on the transmit and receive port cards 102A, 102B are controlled by the control module 130 for the port card of interest, in response to switching instructions received from the switch controller 134. Assume that the switching instructions require the $A^{th}$ optical transmitter element 110 of the $B^{th}$ transmit port card 102A to emit an oriented optical beam 116 with the aim of eventually reaching the $C^{th}$ optical receive element 124 of the $D^{th}$ receive port card 102B (via the reflector 120, if any). The switching instructions are interpreted differently by the control module 130 on the $B^{th}$ transmit port card 102A and the control module 130 on the $D^{th}$ receive port card 102B. Specifically, the control module 130 on the $B^{th}$ port card interpets the switching instructions as "connect the $A^{th}$ optical transmitter element 110 to the $C^{th}$ optical receive element 124 of the $D^{th}$ receive port card 102B", whereas the control module 130 on the $D^{th}$ receive port card 102B interprets the switching instructions as "connect the $C^{th}$ optical receive element 124 to the $A^{th}$ optical transmitter element 110 of the $B^{th}$ transmit port card 102A". The instructions to the $B^{th}$ transmit port card 102A ensure that the correct optical transmitter element 110 shines in the correct direction, while the instructions to the $D^{th}$ receive port card 102B ensure that the correct optical receive element 124 looks in the correct direction for incoming light. It is noted that the $B^{th}$ transmit port card 102A and the $D^{th}$ receive port card 102B may in fact be the same port card.

Figure 8A:
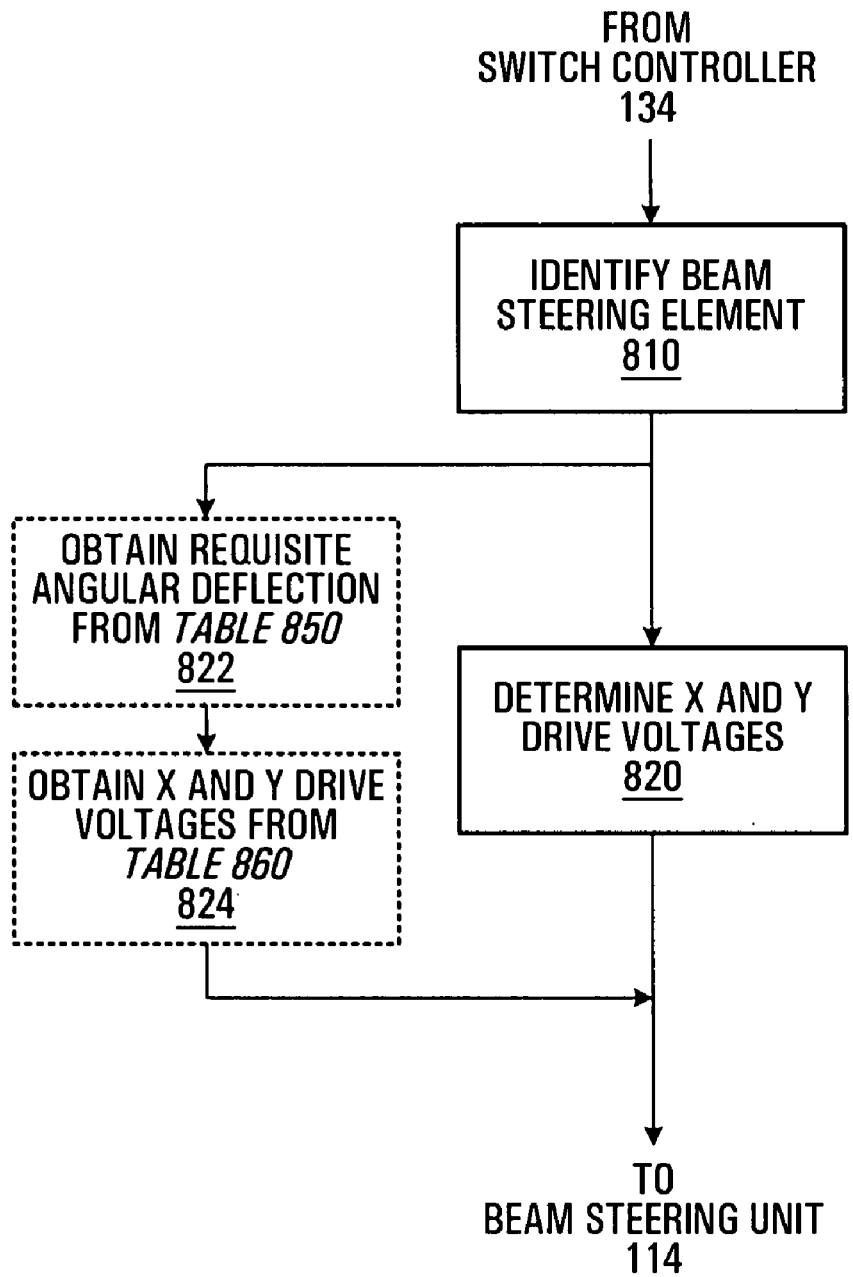
FIG. 8A is a flowchart illustrating operation of a control module responsible for controlling the beam steering element array of FIG. 7A.

Reference is now made to FIG. 8A, which shows the basic steps executed by the control module 130 responsible for the $B^{th}$ transmit port card 102A upon receipt of the switching instructions. At step 810, the control module 130 responsible for the $B^{th}$ transmit port card 102A identifies the particular beam steering element in the transmit beam steering element array 114 responsible for providing a controllable deflection angle for the optical beam 112 emanating from the $A^{th}$ optical transmitter element 110. In addition, at step 820, the control module 130 responsible for the $B^{th}$ port card determines the X and Y drive voltages for that particular beam steering element, with the intent of establishing an optical path to the $C^{th}$ optical receive element 124 on the $D^{th}$ receive port card 102B.

A similar process is carried out for the receive beam steering element array 140 on the $D^{th}$ port card. Specifically, at step 810, the control module 130 responsible for the $D^{th}$ receive port card 102B identifies the particular beam steering element in the receive beam steering element array 140 responsible for shining a beam into the rod lens of the $C^{th}$ optical receive element 142. In addition, at step 820, the control module 130 responsible for the $D^{th}$ port card determines the X and Y drive voltages for that particular beam steering element, with the intent of parallelizing a received optical beam 122 picked up in the direction from the $A^{th}$ optical transmit element 110 on the $B^{th}$ transmit port card 102A.

Of course, it should be appreciated that if more than one beam steering element with a controllable deflection angle is used to deflect the optical beam 112 emanating from the $A^{th}$ optical transmitter element 110 on the $B^{th}$ transmit port card 102A (or if more than one beam steering element with a controllable deflection angle is used to deflect the resultant received optical beam 122 at the receive beam steering element array 140), then step 810 would consist of identifying these plural beam steering elements and step 820 would consist of obtaining the X and Y drive voltages for each of these plural beam steering elements. However, for the sake of simplicity but without intending to limit the scope of the invention, it is hereinafter assumed that only one beam steering element in each of the transmit beam steering element array 114 and the receive beam steering element array 140 needs to be controlled for any given connection.

Figure 8B:
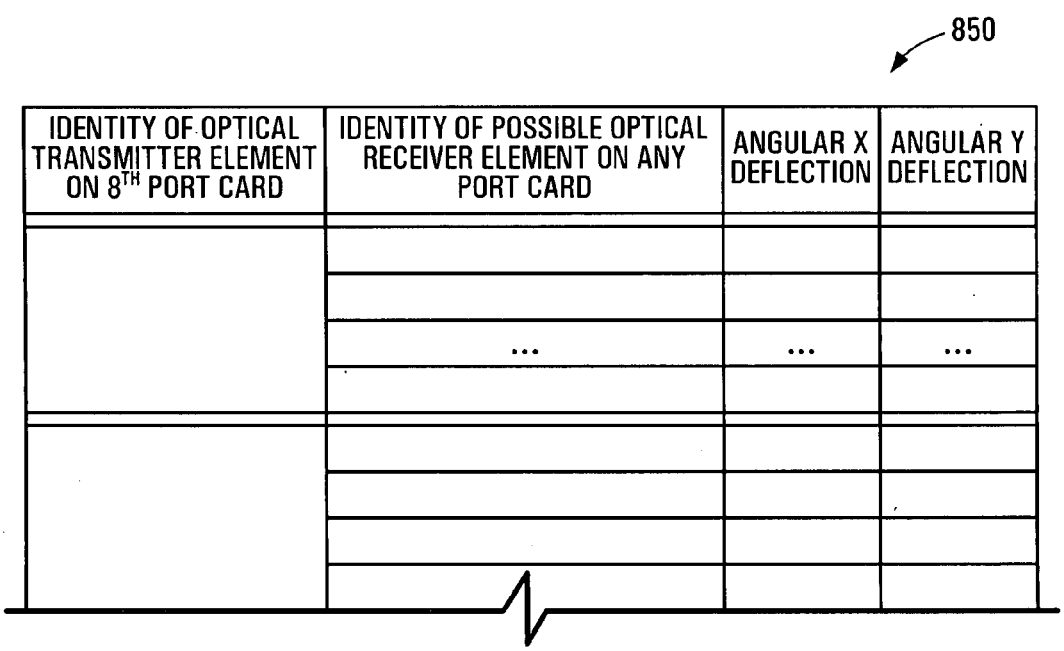
FIGS. 8B and 8C depict possible lookup table structures for use by the control module.
Figure 8C:
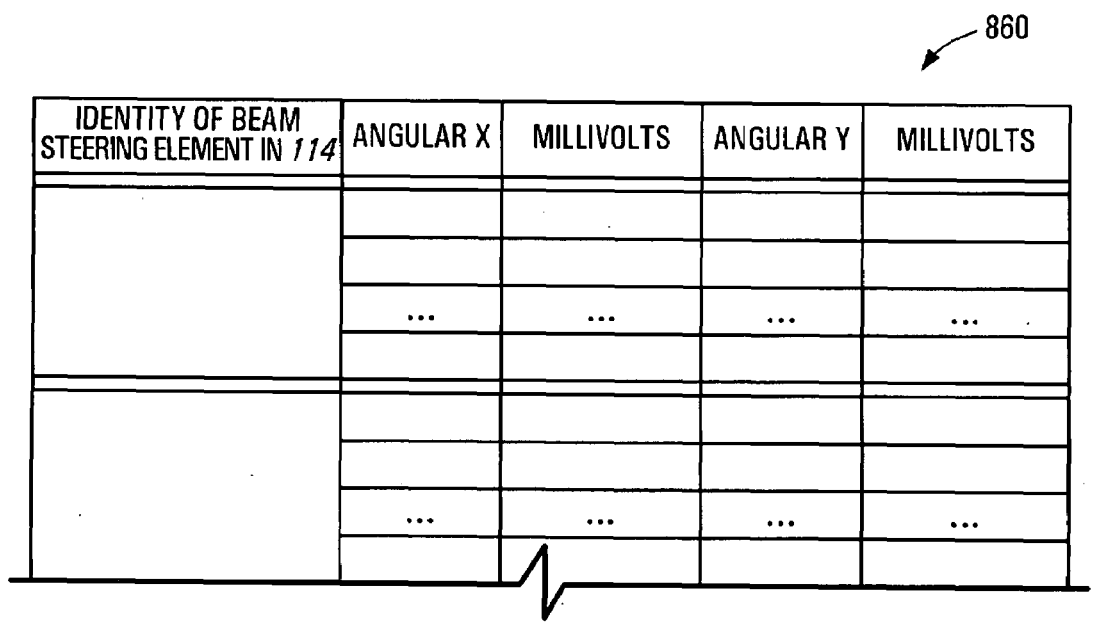

The control module 130 on either the $B^{th}$ transmit port card 102A or the $D^{th}$ receive port card 102B can perform step 820 in many ways. Consider the control module 130 on the $B^{th}$ transmit port card 102A for the sake of example. In one embodiment, step 820 will be performed by consulting a first lookup table (at step 822) followed by a second lookup table (at step 824). With reference to FIG. 8B, the first lookup table 850 maps each combination of optical transmitter element 110 on the $B^{th}$ transmit port card 102A and possible optical receive element 124 (on any receive port card 102B) to the required X and Y angular deflections for the beam steering element in the path of the optical beam 112 emanating from the optical transmitter element 110 in the combination. The second lookup table 860 (see FIG. 8C) maps the angular deflection per applied millivolt, for both the X and Y directions, for each beam steering element on the $B^{th}$ transmit port card 102A. Thus, consultation of the first lookup table 850 at step 822 results in obtaining the requisite angular deflection for the beam steering element in the transmit beam steering element array 114 located in the path of the $A^{th}$ optical transmitter element 110, whereas consultation of the second lookup table 860 at step 824 results in obtaining the drive voltages necessary for achieving the requisite angular deflection. A similar set of tables is used on the $D^{th}$ port card to establish the drive voltages to the beam steering elements in the beam steering element array 140 so that they couple a beam from the appropriate direction into the optical receive elements 124 on the $D^{th}$ port card.

The first lookup table 850 can be populated analytically from the physical geometry of the switch 100, i.e., based on parameters such as the depth of the optical chamber 118, the spacing between the port cards (i.e., pitch), as well as the presence or absence of a prism plate 300 (and its refractive characteristics, if present). Since the transmit port cards 102A are interchangeable, it may be advantageous to store the first lookup table 850 in volatile memory to allow modification as the switch 100 is scaled, although this is not a requirement.

The second lookup table 860, i.e., which maps angular deflection to applied voltage for the beam steering elements on a given transmit port card 102A (e.g., the $B^{th}$ transmit port card 102A), can be populated during an initialization phase of the manufacturing process of the given transmit port card 102A. By way of example, this initialization phase may entail pointing each beam steering element of the given transmit port card 102A at a variety of test detectors in order to compute a "deflection sensitivity map" for the beam steering element. In one embodiment, this may require a large number of values for both the X, Y directions for each beam steering element. In another embodiment, a smaller number of vertical and horizontal locations is established, while the rest are computed by a polynomial "form-fit". The voltages required to achieve specific deflections, whether obtained directly or through polynomial interpolation, form the second lookup table 860. Since the second lookup table 860 is specific to the hardware on the given transmit port card 102A, it may be advantageous to store the second lookup table 860 in non-volatile memory, although this is not a requirement.

As an alternative to maintaining the two lookup tables 850, 860, a single composite lookup table could be created and stored in volatile memory, thus (in the case of the $B^{th}$ transmit port card 102A, for example) mapping each combination of optical transmitter element 110 (on the $B^{th}$ transmit port card 102A) and possible optical receive element 124 (on any receive port card 102B) to the required X and Y voltages to be applied to the beam steering element in the path of the optical beam 112 emanating from the optical transmitter element 110 in the combination. Yet another alternative would be to fit a very high order polynomial to the values in such composite lookup table and to store the coefficients of the resultant polynomial. In this way, a polynomial computation is required on the part of the control module 130, there will be a reduced need for memory, since only the coefficients of the polynomial need to be stored.

Regardless of the manner in which step 820 is performed, the result will be that (i) the oriented optical beam 116 resulting from action of the transmit beam steering element array 114 upon the optical beam 112 emanating from the $A^{th}$ optical transmitter element 110 will be shone towards the reflector 120 in a direction that is intended to cause the received optical beam 122 to reach the $C^{th}$ optical receive element 124 on the $D^{th}$ receive port card 102B; and (ii) the beam steering element array associated with the $C^{th}$ optical receive element 124 on the $D^{th}$ receive port card 102B will capture an incoming optical beam 122 from the direction associated with the $A^{th}$ optical transmitter element 110 on the $B^{th}$ transmit port card 102A and couple it into the $C^{th}$ optical receive element 124. With, say, a +/−7 degree full-scale deflection and a one-in-10,000 resolution, the use of the look up tables 850, 860 allows aiming of a particular beam steering element to a precision of about 0.7 milli-degrees, which, at the end of an optical path that may be of the order of a meter in length, results in an "aiming granularity" on the order of roughly 0.24 mm, i.e., the location of the end of the received optical beam 122 in three-dimensional space can be controlled with an initial pointing precision of 0.24 millimeters.

It should be noted that due to a variety of factors, one might not always be able to rely on the beam steering elements producing correctly aligned oriented optical beams 116 based on pre-computed lookup tables or polynomials. In other words, the above-defined pointing precision does not necessarily translate into a pointing accuracy. For instance, while it is possible to produce changes as small as 0.24 mm in the vertical or horizontal location of the received optical beams 122, the initial oriented optical beam 116 may be misaligned to begin with, this despite the manufacturing calibration performed to produce the second lookup table 860. Examples of possible error sources in obtaining consistent pointing accuracy include:

repeatability of the setting of individual beam steering elements (e.g., MEMS mirrors 602); although it is expected to be excellent, there might be an unknown aging mechanism in the mirror deflection torsion members;

tolerances in the X, Y and Z positions occupied by individual transmit and receive port cards 102A, 102B as they are held in position by the slots of the card cage;

tolerances in the angular positions occupied by individual transmit and receive port cards 102A, 102B as they are held in position by the slots of the card cage;

errors in the angles of the strips 302 of the prism plate 300; with a refractive index of, say, 1.5, a one-degree facet angle will produce about 0.3-0.5 degree of pointing error, depending on the angle of incidence and other factors; based on what is commercially available for precision prisms it is reasonable to control facet angles (by precision grinding) to +/−0.01 degree or better giving rise to approximately 0.003-0.005 degrees of pointing error;

errors in the flatness of the reflector 120 and its angular positioning at the end of the optical chamber 118; assuming that the reflector 120 can be made optically flat, the main error will be the depth of the optical chamber 118, which may have approximately 0.5 mm of depth error.

Assuming a 28 degree optical deflection cone (i.e., +/−7 degrees mechanical movement in each of the X and Y directions) and a path length of 1 meter, a tally of the worst-case error from the above sources may resemble the following:

| | |
|---|---|
| digitization resolution/presets: | +/−0.12 mm |
| card slot tolerance in X, Y, Z dimensions: | +/−0.2 mm |
| card slot tolerance (angular): | +/−0.17 mm |
| prism facet angle: | +/−0.09 mm |
| reflector placement: | +/−0.53 mm |
| TOTAL | +/−1.11 mm |

With a mirror having dimensions of roughly 1 mm in diameter, the above worst-case cumulative error is sufficient for the received optical beam 122 to miss the target beam steering element in the receive beam steering element array 140.

Now, using some example dimensions not indicative of any limitation or restriction of the present invention, if the pitch of the port cards is 7.5 mm and the spacing between adjacent optical transmitter elements 110 is greater than about 1.5 mm, then the use of the lookup tables 850 and 860 will orient the beam steering element in the transmit beam steering element array 114 so that the ensuing received optical beam 122 points somewhere in an imaginary circle of diameter 2.2 mm, centered on the target beam steering element in the receive beam steering element array 140.

Figure 9A:
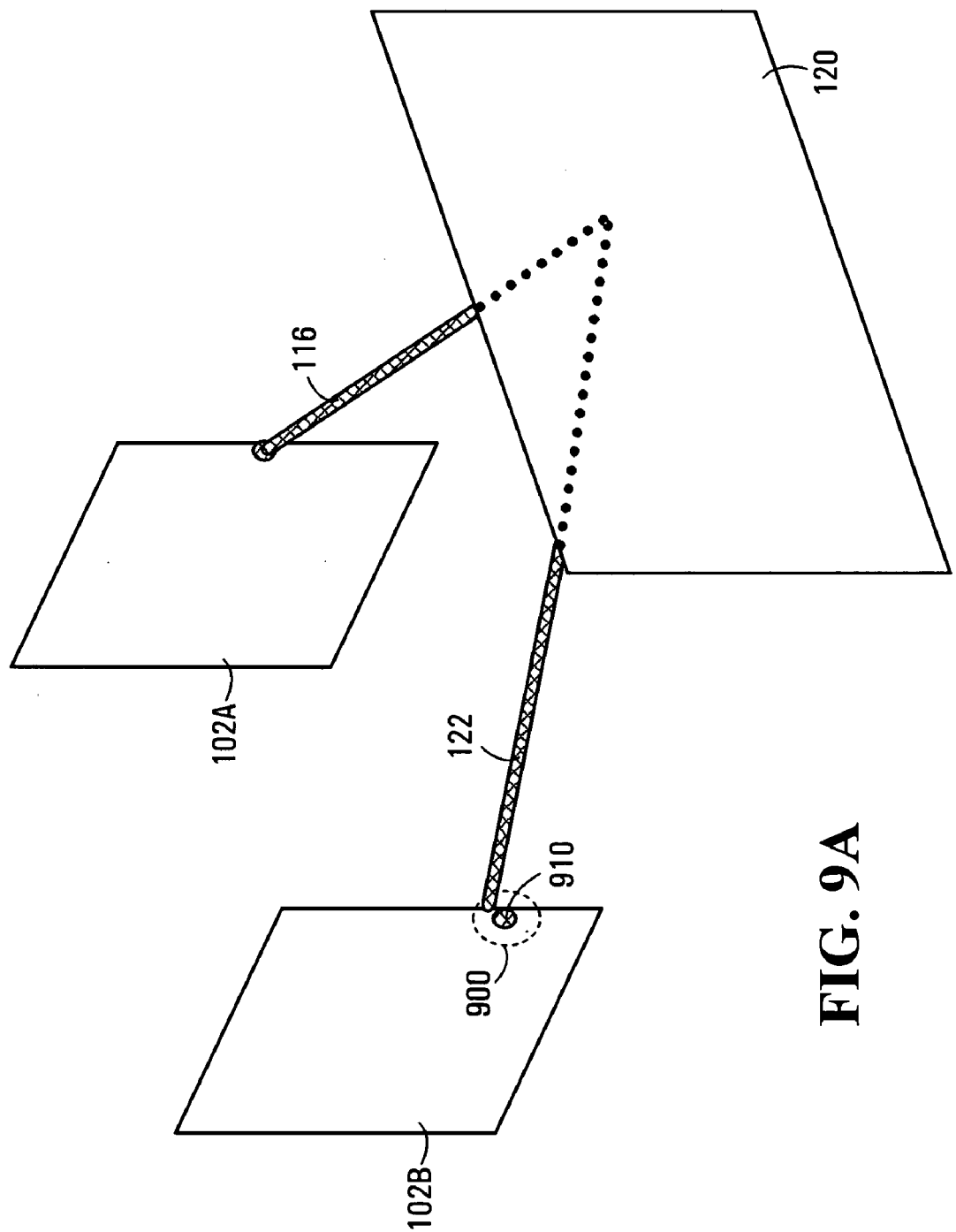
FIG. 9A is a view of a transmit port card and a receive port card from the perspective of a reflector, illustrating misalignment of an optical beam sent in an unpredictable direction of departure.

With reference to FIG. 9A, this imaginary circle, hereinafter referred to as a "circle of uncertainty" 900, surrounds an "area of detectability" 910 representative of the available detection area of the target beam steering element in the receive beam steering element array 140. Assuming that the width of the received optical beam 122 at the end of its optical path to be 650 microns, it becomes apparent that although the received optical beam 122 might not be pointing directly towards the area of detectability 910, it is nonetheless "close by", i.e., somewhere in the surrounding circle of uncertainty 900. Thus, the first challenge is to control the appropriate beam steering element in the transmit beam steering element array 114 so as to cause the received optical beam 122 to point directly at the area of detectability 910, i.e., towards the center of the circle of uncertainty 900.

Figure 9B:
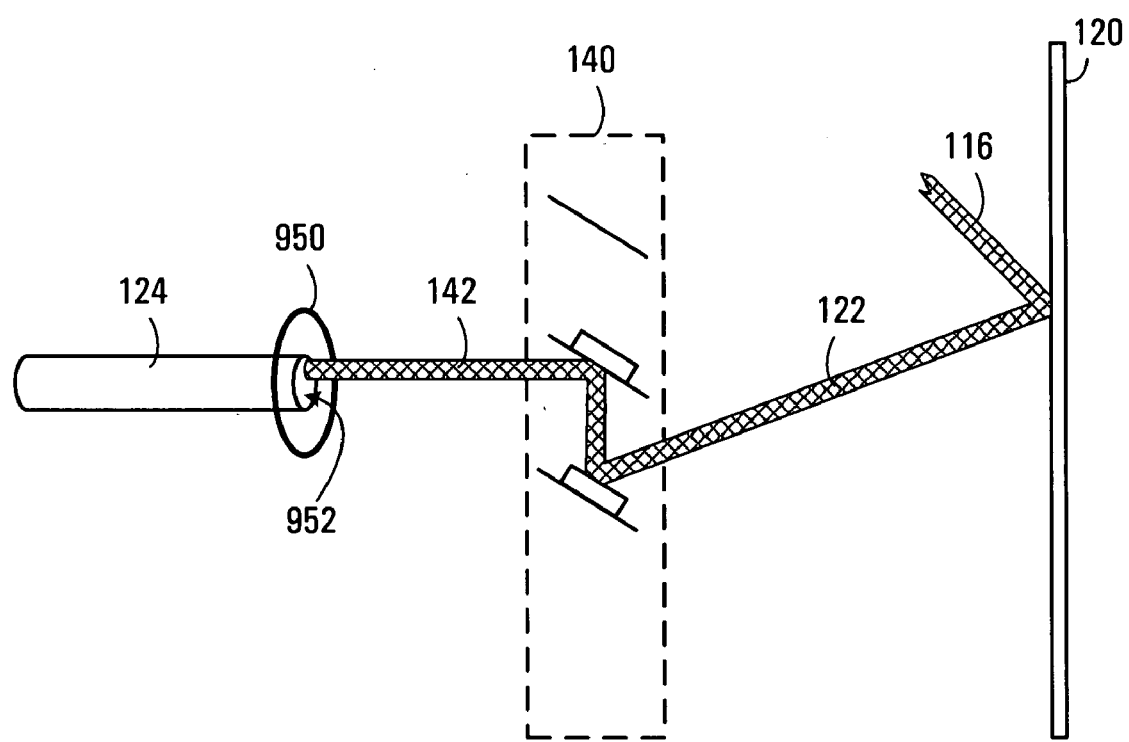
FIG. 9B illustrates misalignment of an optical beam arriving at a beam steering element in an unpredictable direction of arrival.

Still, even with the received optical beam 122 pointing directly at the area of detectability 910, it is possible that the target beam steering element in the receive beam steering element array 140 will cause an error in deflecting the received optical beam 122 towards the corresponding optical receive element 124 having its own "area of detectability". With reference to FIG. 9B, the use of the lookup tables 850 and 860 will orient the beam steering element in the receive beam steering element array 140 so that the ensuing deflected optical beam 142 will point somewhere in a circle of uncertainty 950 but not necessarily directly at the area of detectability 952 associated with the corresponding optical receive element 124 and whereby the optical receive element 124 can correctly focus the deflected optical beam 142 on to the exiting waveguide into the rest of the receive port card 102B. Thus, the second challenge is to control the appropriate beam steering element in the receive beam steering element array 140 so as to cause the deflected optical beam 142 to impinge directly on the appropriate optical receive element 124. It is noted that the circle of uncertainty 950 is somewhat smaller than the circle of uncertainty 900 due to the shorter distance between the beam steering element and the optical receive element 124.

In order to shine the oriented optical beam 116 of interest onto the target beam steering element in the receive beam steering element array 140, or in order to shine the received optical beam 122 onto the corresponding optical receive element 124, the control module 130 on the appropriate transmit or receive port card 102A, 102B performs a "fine tuning process", which is optional. In other words, it should be understood that the discussion to follow is merely illustrative of an example way to improve the pointing accuracy when such improvement is desired, and in no way implies the necessity to improve the pointing accuracy. Depending on the quality and tolerances of the components of the switch 100, it may or may not be sought to improve the pointing accuracy afforded by straightforward execution of step 820 in the control module 130 of both the transmit port card 102A and the receive port card 102B.

Expressed in general terms, the fine tuning process solves the problem of locating an area of detectability (e.g., 910, 952) from somewhere in a surrounding circle of uncertainty (e.g., 900, 950). To this end, the controller 130 on the transmit port card 102A causes a controlled and variable level of sinusoidal modulation voltages (tones) to be added in phase quadrature to the X and Y drive voltages applied to the beam steering element in the transmit beam steering element array 114 which emits the oriented optical beam 116 of interest. Similarly, the controller 130 on the receive port card 102B causes a controlled and variable level of sinusoidal modulation voltages (tones) to be added in phase quadrature to the X and Y drive voltages applied to the beam steering element in the receive beam steering element array 140 which deflects the received optical beam 122 of interest towards the corresponding optical receive element 124.

Figure 9C:
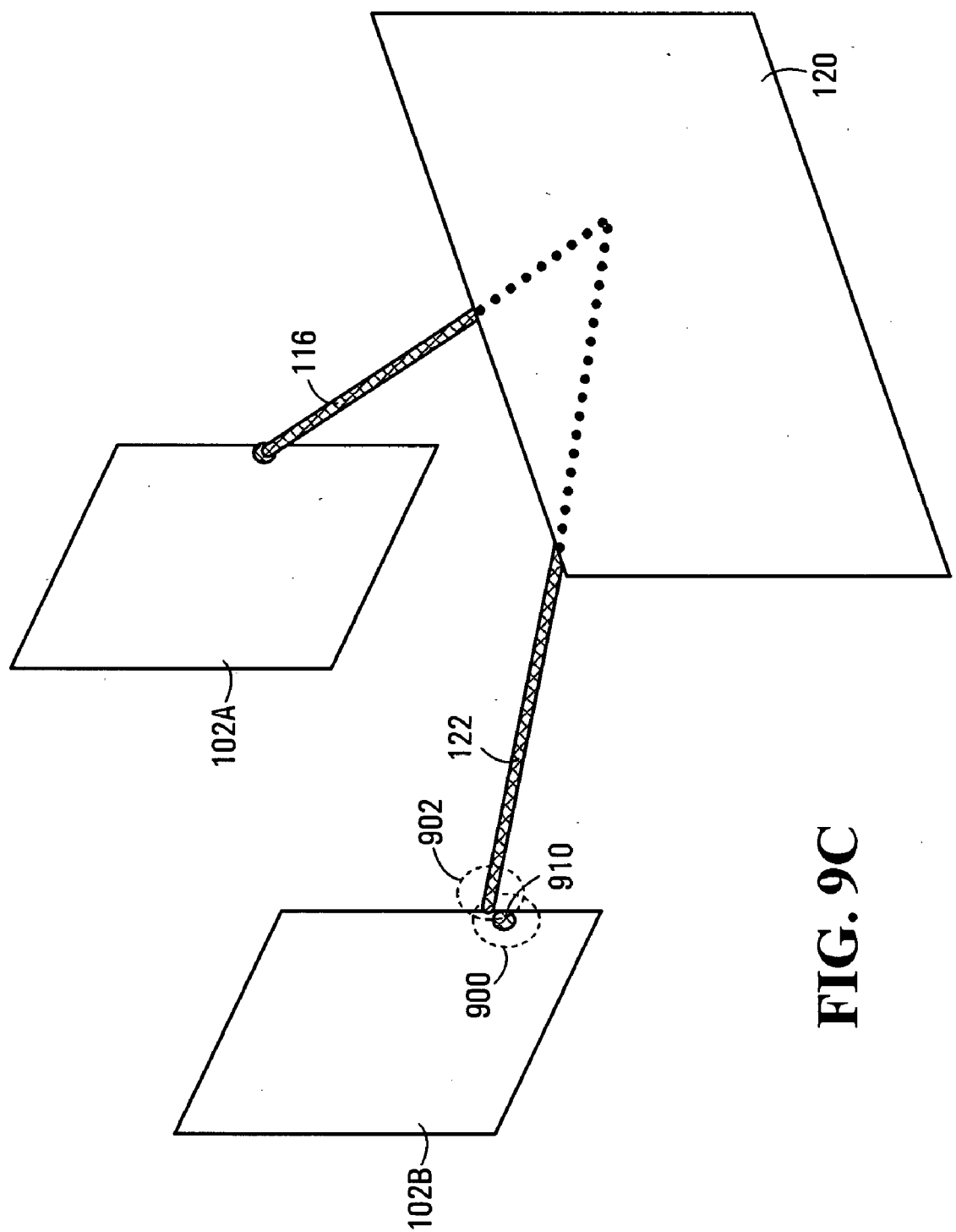
FIG. 9C is a view of a transmit port card and a receive port card from the perspective of a reflector, illustrating precession of an optical beam under control of the transmit port card.

In the case of each or either beam steering element being implemented as a mirror 602 (see FIG. 6), the modulation voltages are applied by sinusoidally varying the voltages applied to the electrodes 608 responsible for movement in the +X and +Y directions, but at opposite phases between the +X, −X electrodes and between the +Y and −Y electrodes, and in phase-quadrature between the +X, +Y electrodes. As shown in FIG. 9C for example, the addition of modulation voltages in phase quadrature in the above described way causes the oriented optical beam 116 deflected by the mirror 602 to be driven into an angular displacement ("wobble" or "precession") which sweeps an orbital trajectory 902 with a period corresponding to the frequency of the modulation voltages.

The amplitude of the modulation voltages are designed (or can be controlled) to make the orbital trajectory 902 sufficiently wide so as to intersect the area of detectability 910. For ease of understanding, it will be assumed in what follows that the modulation voltages applied to the X and Y drive voltages cause the oriented optical beam 116 to precess at a frequency (or "precession tone") $f_T$. However, applying different modulation voltages to the X and Y drive voltages changes the trajectory 902 and controls the precession orbit diameter, and it should be understood that such modifications to the trajectory 902 are well within the scope of the present invention.

A similar technique process is applied to when deflecting the received optical beam 122 towards the corresponding optical receive element 124. In this case, the amplitude of the modulation voltages are designed (or can be controlled) to make the orbital trajectory of the deflected optical beam 142 sufficiently wide so as to intersect the area of detectability 952 of the optical receive element 124. For ease of understanding but without limiting the scope of the present invention, it will be assumed in what follows that the modulation voltages applied to the X and Y drive voltages cause the deflected optical beam 952 to precess at a frequency $f_R$.

By tapping a small amount of the received optical signal into the receive port card 102B and detecting that signal in an opto-electronic receiver, after the optical signal has completed its transition into the waveguide environment of the receive port card and by analyzing the frequency, amplitude and phase of the precession tones $f_T$, $f_R$ present in the optical signal detected as being received at the optical receive element 124, and comparing these parameters to those of the precession tone expected to be received by the optical receive element 124, one can compute the "pointing error", both in directing the oriented optical beam 116 at the transmit beam steering element array 114, and in deflecting the received optical beam 122 at the receive beam steering element array 142.

Specifically, the presence of a precession tone at frequency $f_T$ in the received optical signal indicates that the received optical beam 122 is in the correct circle of uncertainty 900 to begin with, while the amplitude of the received optical signal is indicative of the radial distance of the center of the trajectory 902 from the area of detectability 910, and the relative phase of the received optical signal is indicative of the angle at which the center of the trajectory 902 is located relative to the area of detectability 910. This allows computation of a horizontal displacement correction $dH_T$ and a vertical displacement correction $dV_T$ required to properly align the oriented optical beam 116.

Similarly, the presence of a precession tone at frequency $f_R$ in the received optical signal indicates that the received optical beam 122 is in the correct circle of uncertainty 950 to begin with, while the amplitude of the received optical signal is indicative of the radial distance of the center of the deflected optical beam 142 from the area of detectability 952, and the relative phase of the received optical signal is indicative of the angle at which the center of the deflected optical beam 142 is located relative to the area of detectability 952. This allows computation of a horizontal displacement correction $dH_R$ and a vertical displacement correction $dV_R$ required to properly align the deflected optical beam 142.

It may be convenient to assign different sets (or ranges) of potential values to $f_T$ and $f_R$, in order to assist in discriminating between transmit and receive precession tone frequencies. Furthermore, to simplify the separation of the composite signal from the detector into the components $f_T$ and $f_R$ of the resultant detected signal (which will contain both of the transmit and receive precession tone frequencies), it may be convenient to use techniques including but not limited to separating the ranges of $f_T$ and $f_R$ by a substantial factor (e.g., 10:1 or more) or to use a form of orthogonal modulation of the $f_T$, $f_R$ components to simplify detectability of each in the presence of the other.

Figure 10:
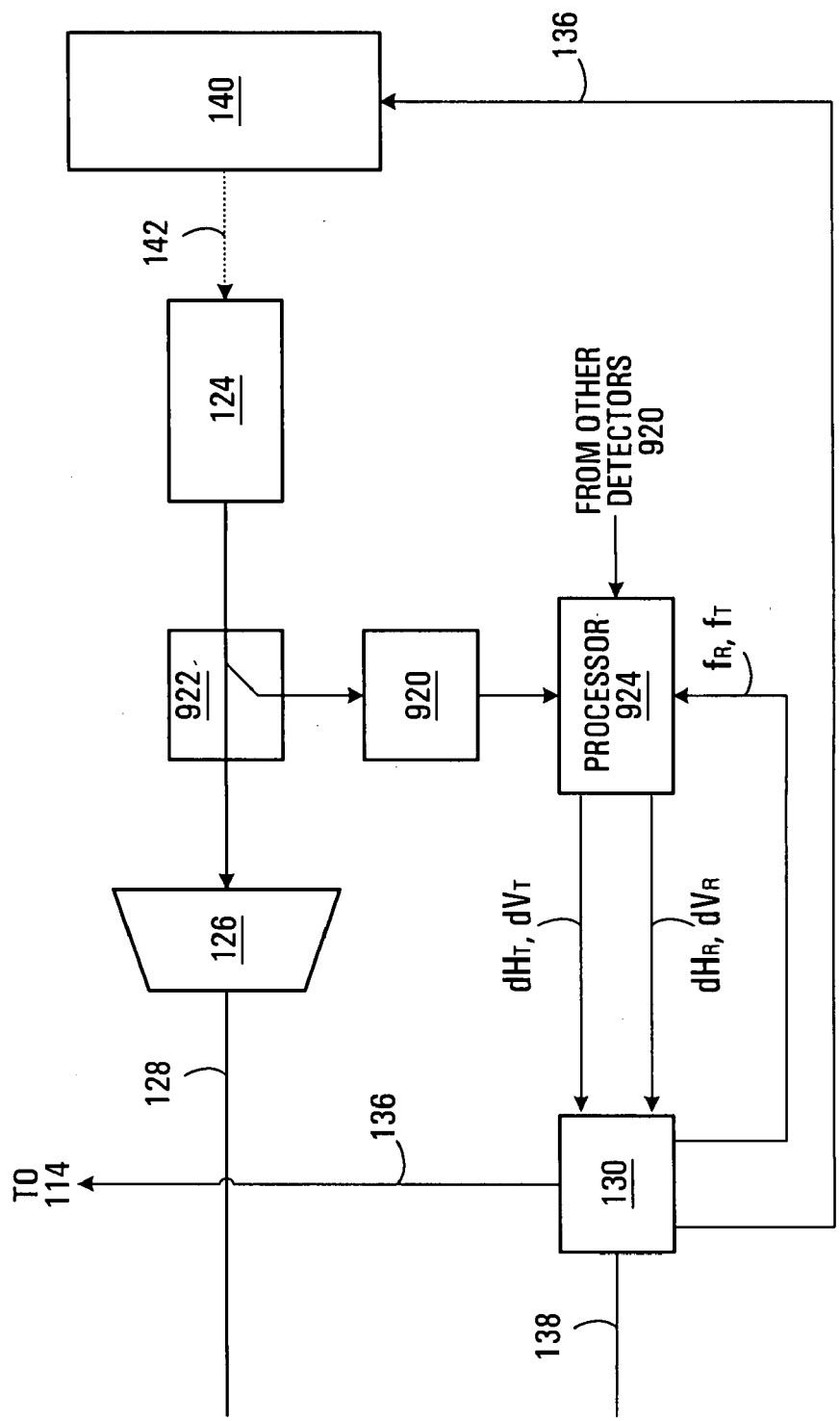
FIG. 10 shows, in block diagram form, a circuit for detecting characteristics of a received optical beam.

Detection of the precession tones at frequencies $f_T$ and $f_R$ in the optical signal received at the optical receive element 124 can be achieved using a circuit as shown in FIG. 10, which comprises an optical detector 920 connected to the output of the optical receive element 124 via an optical coupler 922. The optical detector 920 may be implemented as a photodiode, while the optical coupler 922 may be implemented as a fractional tap coupler. A processing unit 924 is connected to the optical detector 922 and possibly other optical detectors associated with other optical receive elements 124. The processing unit 924 is shown as residing on the receive port card 102B, although it should be appreciated that the processing unit 924 associated with a given receive port card 102B can be located on that receive port card 102B itself, on another port card, on a separate "controller card", or multiple processing units 924 can be consolidated onto a smaller number of separate controller cards, which may be the same controller cards that support the control units 130 if these are consolidated as well.

The processing unit 924 has the role of determining the frequency, amplitude and phase of the precession tones present in the optical signal detected as being received at the optical receive element 124. It is assumed that the processing unit 924 knows $f_R$ and $f_T$ based on the connection map. In the manner described above, the processing unit 924 computes $dH_T$, $dV_T$, $dH_R$ and $dV_R$. The values $dH_T$ and $dV_T$ are supplied to control module 130 responsible for the transmit beam steering element array 114 that emits the oriented optical beam 116. This can be achieved by using the same data bus 138 used to carry the switching instructions to the various transmit port cards 102A, for example. The values $dH_R$ and $dV_R$ are supplied to control module 130 responsible for the receive beam steering element array 140 that emits the deflected optical beam 142.

In the context of the fine tuning process, the behaviour of the control module 130 responsible for the transmit beam steering element array 114 that emits the oriented optical beam 116 for a particular combination of optical transmitter element 110 and optical receive element 124 is now described with reference to the flowchart in FIG. 11. A virtually identical flowchart applies to the control module 130 responsible for the receive beam steering element array 140 that provides the deflected optical beam 142 to the optical receive element 124 of this combination, based on the values $dH_R$ and $dV_R$. For simplicity, only the process for controlling the transmit beam steering element array 114 will be described in detail, it being assumed that a person skilled in the art will be able to modify this process and apply it to the receive beam steering element array 140.

It will be seen that step 822 is the same as in FIG. 8, and consists of consulting of the first lookup table 850 to obtain the requisite angular deflection for the beam steering element which outputs the oriented optical beam 116. At this point, the control module 130 executes step 1110, which consists of receiving the values $dH_T$ and $dV_T$ from the processing unit 924 on the receive port card 102B which houses the optical receive element 124 of the particular combination in question. At step 1112, the control module 130 checks to see whether the fine tuning process has previously been started for the particular combination of optical transmitter element 110 and optical receive element 124. If not, then step 1114 is executed, where the values $dH_T$ and $dV_T$ are used to compute a pointing error that is compared to a "trigger threshold". The trigger threshold 1114 is selected to represent a pointing error that is sufficiently large to require the fine tuning process to be initiated or re-initiated. Clearly, the trigger threshold is an arbitrary design parameter based upon the specific tolerances, dimensions and sensitivities of specific design implementations and its selection would be a matter of routine for a person of ordinary skill in the art.

If the pointing error is indeed greater than the trigger threshold, the control module 130 executes step 1116, where the fine tuning process is formally started, followed by step 1118, by virtue of which the control module 130 begins the act of monitoring the "net angular compensation" as applied (to be seen in later steps) to the X and Y angular deflection for the current combination of optical transmitter element 110 and optical receive element 124. While not used right away, the value of this "net angular compensation" at the end of the fine tuning process will indicate by how much the angular deflection shown in the first lookup table 850 should have been varied in order to cause the received optical beam 122 to have been shone directly onto the area of detectability 910.

After execution of step 1118—or if execution of step 1114 indicates that the pointing error was not greater than the trigger threshold, the control module 130 proceeds to step 1120, where an angular compensation for the pointing error is computed. The computed angular compensation can be as great in absolute value as the pointing error computed from the values $dH_T$ and $dV_T$ received from the processing unit 924; however, it can be less in absolute value, so as to encourage stability of the feedback control loop having been created. At step 824, the X and Y drive voltages are obtained from the second lookup table 860 by looking up the angular deflection obtained at step 822 but compensated by the value found at step 1120. Finally, as the final step in the fine tuning process, step 1122 is executed, where each of the X and Y drive voltages is modulated by a precession tone having a particular frequency $f_T$ and a particular amplitude as discussed herein below. The fine tuning process subsequently returns to step 1110, where new values $dH_T$ and $dV_T$ are received from the processing unit 924. If the fine tuning process is running successfully, then it is expected that the pointing error that is computed from the values $dH_T$ and $dV_T$ received during the next iteration of step 1110 will be no greater (in absolute value terms) than the one during the previous iteration of step 1110.

As indicated above, each of the X and Y drive voltages is modulated at step 1122 by a precession tone, which has a particular "precession amplitude" that should not be excessively large or exceedingly small. Specifically, it will be appreciated that when the center of the trajectory 902 of the received optical beam 122 is far off from the center of the area of detectability 910, then too small a precession amplitude will cause the trajectory 902 of the received optical beam 122 to make small circles that never intersect the area of detectability 910. On the other hand, too large a precession amplitude once the center of the trajectory 902 of the received optical beam 122 has become aligned with the center of the area of detectability 910 (i.e., after "convergence" has been achieved) will cause the trajectory 902 of the received optical beam 122 to make big circles that also never intersect the area of detectability 910. For this reason, it may be advantageous during the fine tuning process to begin with a larger amplitude before convergence and to gradually decrease the amplitude of the precession tone as convergence is achieved, and to continue doing so until it is noticed that the pointing error has dropped to below a convergence threshold.

Figure 11:
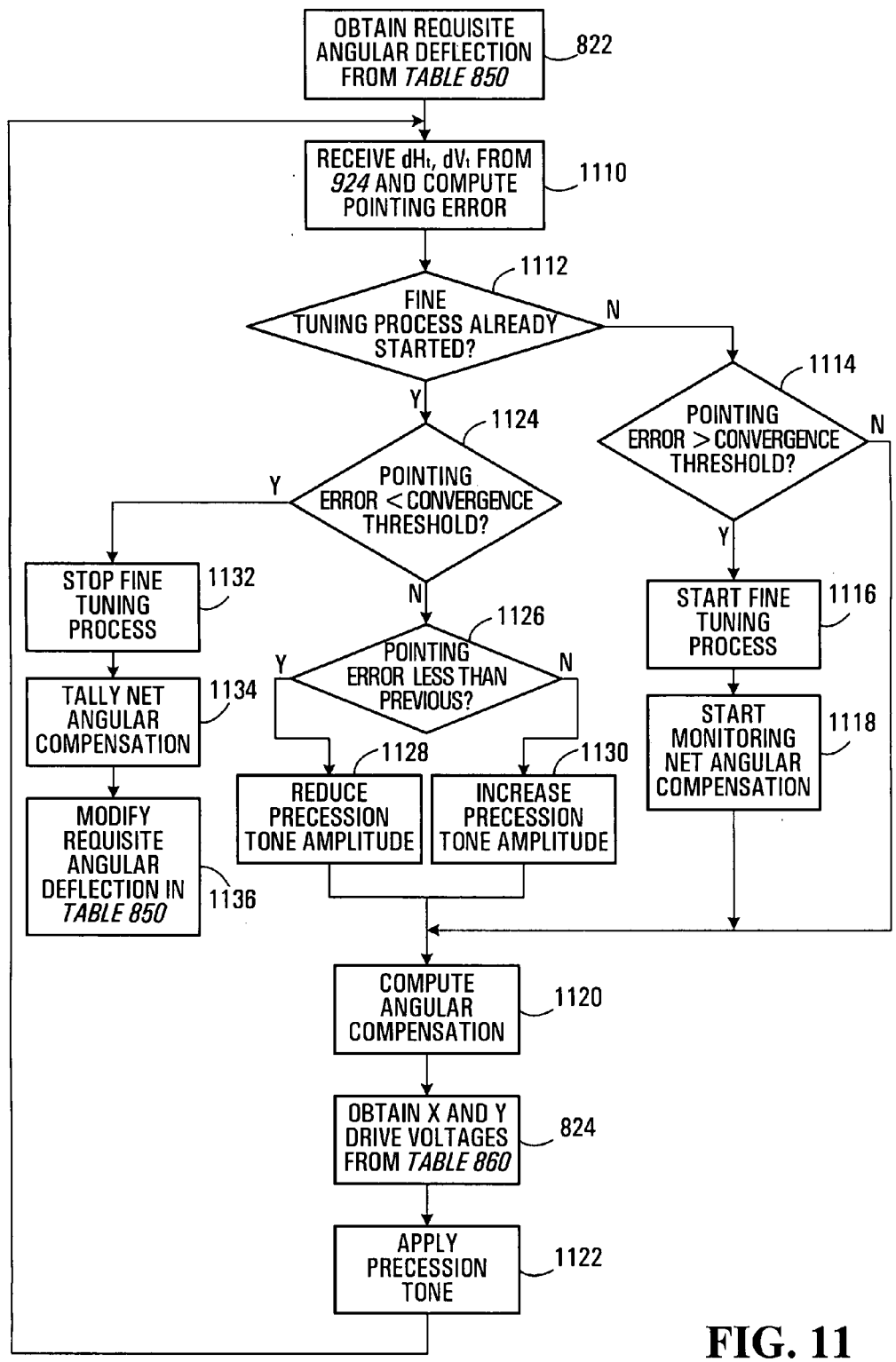
FIG. 11 is a flowchart illustrating operation of a control module responsible for executing a fine tuning process to steer an optical beam.

The above described approach translates into additional steps in the flowchart of FIG. 11. Specifically, returning to step 1112 and assuming that execution of this step indicates that the fine tuning process has already been started (i.e., due to previous execution of step 1116), then the pointing error computed at step 1110 is compared to a "convergence threshold" at step 1124. The convergence threshold represents the amount of pointing error considered to be sufficiently small to indicate that the received optical beam 122 is satisfactorily centered within the area of detectability 910. Clearly, the convergence threshold is an arbitrary design parameter and its selection would be a matter of routine for a person of ordinary skill in the art.

If the pointing error is greater than the convergence threshold, then there continues to be a need to center the received optical beam 122 within the area of detectability 910. Thus, the control module 130 proceeds to step 1126, where the value of the pointing error computed during the current iteration of step 1110 is compared to the value of the pointing error computed during the previous iteration of step 1110. If it is greater, then this effectively means that the received optical beam 122 has moved further from the center of the area of detectability 910, in which case it may be desirable to increase the amplitude of the precession tone (step 1130), so as to ensure that it will intersect the area of detectability 910. If it is less, then this effectively means that the received optical beam 122 has moved closer to the center of the area of detectability 910, in which case it may be desirable to decrease the amplitude of the precession tone (step 1128), so as to ensure that the optical beam will not remain entirely outside the area of detectability 910 as it precesses.

Upon having decided on how to modify the amplitude of the precession tone, steps 1120, 824 and 1122 are executed as previously described. It should be understood that control of the amplitude of the precession tone (steps 1126-1130) can be effected using a more sophisticated algorithm, and in some cases the amplitude of the precession tone need not be varied at all, or it may be varied differently in the X and Y directions, or it may be varied in a manner that is independent of the magnitude of the pointing error received at step 1110.

As centering of the received optical beam 122 within the area of detectability 910 is achieved over time, the pointing error will eventually fall below the convergence threshold, and the "YES" branch emanating from step 1124 is taken, followed by stoppage of the fine tuning process at step 1132. Next, step 1134 provides for the tallying of the net angular compensation (computed at each execution of step 1120) over the duration of the fine tuning process since it was started at step 1116. The net angular deflection so tallied represents a correction to the angular deflection that is currently maintained in "row" of the first lookup table 850 corresponding to the current combination of optical transmitter element 110 and optical receive element 124. Accordingly, step 1136 provides the option of modifying this "row" of the first lookup table 850 by the amount of the net angular compensation. By making this modification to the first lookup table 850, the fine tuning will be accelerated in the event that the current combination of optical transmitter element 110 and optical receive element 124 is disconnected but then needs to be re-connected at a future time. Finally, since convergence has been achieved, there is no need to compensate the angular deflection that was initially obtained at step 822 (i.e., step 1120 can be skipped). Also, the X and Y drive voltages remain the same as before (i.e., step 824 can be skipped) and the precession amplitude need not be changed (i.e., step 1122 can be skipped). The algorithm thus returns to step 1110, where new values $dH_T$ and $dV_T$ are received from the processing unit 924.

Figure 12:
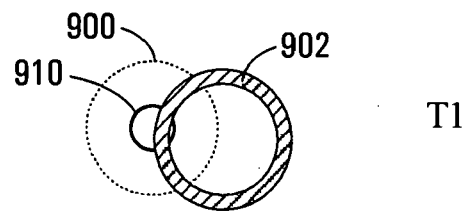
FIG. 12 illustrates the fine tuning process at various stages of execution.
Figure 12:
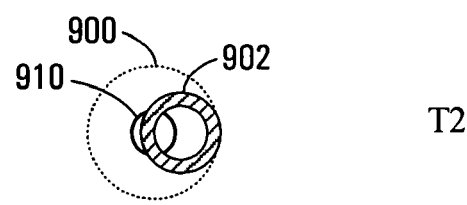
Figure 12:
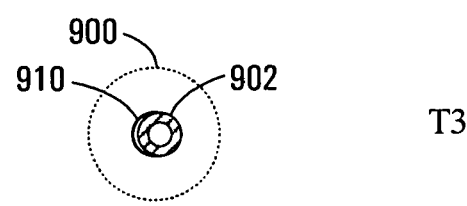
Figure 12:
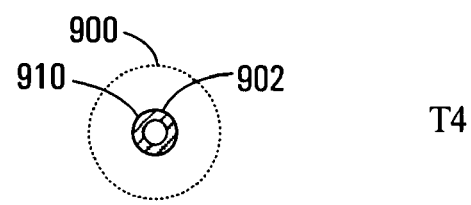

To illustrate the effects of fine tuning process, reference is had to FIG. 12, which shows corrections being applied over time (at instants T1, T2, T3, T4) to fine tune the angular deflections of the beam steering element producing the oriented optical beam 116. It is apparent that the precession amplitude is reduced until, eventually, the detected precession tone is small enough in amplitude that the received optical beam 122, when precessing but locked on target, remains fully within the area of detectability 910. In other words, at instant T4, the processing unit 924 detects a full-strength signal but no precession tone.

By continuing the precessing motion during normal operation of the switch 100 (i.e., even after convergence), it is possible to detect if and when the deflected optical beam 120 ceases to be fully within the area of detectability 910. If the received optical beam 122 partly exits the area of detectability 910, the precessing motion of the oriented optical beam 116 will cause the received optical beam 122 to oscillate in and out of the area of detectability 910, and this will be detected by the processing unit 924. However, in other embodiments, the control module 130 may, in response to convergence, end the fine tuning process by simply stopping the precessing motion of the received optical beam 122.

It will be appreciated that when the switching instructions change, the control module 130 responsible for each transmit port card 102A responds accordingly by re-executing the algorithm in FIG. 8 and obtaining new X and Y drive voltages for the various beam steering elements associated with the optical transmitter elements 110 on the transmit port card 102A in question. If appropriate, the fine tuning process described above and with reference to FIG. 11 is re-initiated for each new combination of optical transmitter element 110 and optical receive element 124. It is noted that if step 1136 has previously been executed for the new combination of optical transmitter element 110 and optical receive element 124, then the fine tuning process will be dramatically shortened, since the first lookup table 850 will already be pre-compensated. Any further fine tuning will be due to equipment aging having occurred since the previous time the particular combination of optical transmitter element 110 and optical receive element 124 needed to be connected, and re-execution of the fine tuning process allows the effects of such equipment aging to be detected, tracked and compensated.

Figure 1:
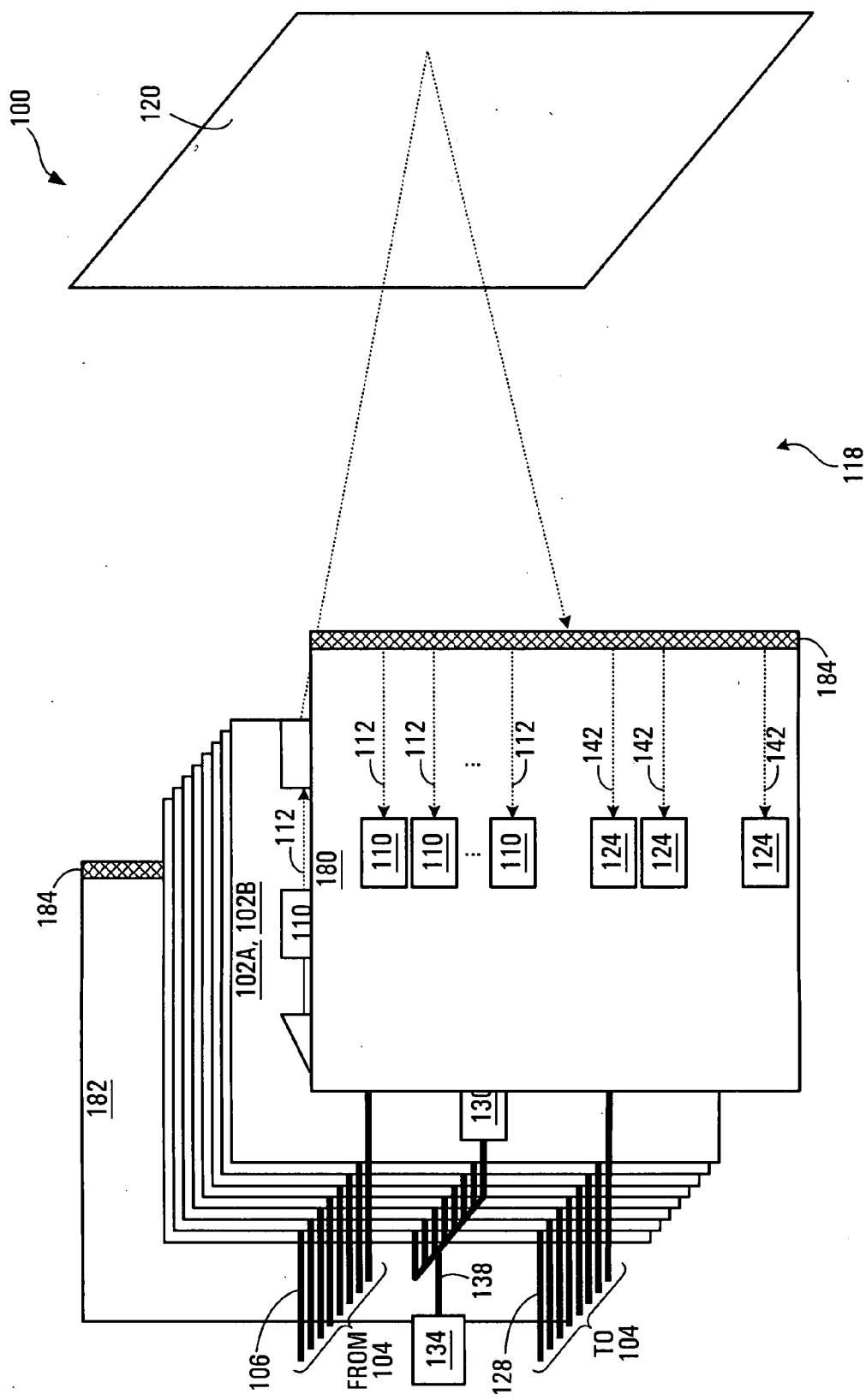
FIG. 1 is a block diagram showing the use of test cards for an out-of-service calibration procedure.

As an alternative or an enhancement of the fine tuning process, an out-of-service calibration procedure can be used, as now described with reference to FIG. 1. Under such circumstances, one or more test cards 180, 182 are provided. For example, in the case where there are two test cards 180, 182, one could be positioned in each of the leftmost and rightmost slots of the card cage. In an alternative embodiment, individual ones of the transmit or receive port cards 102A, 102B could be temporarily removed and replaced with a single test card. Each of the test cards 180, 182, rather than containing beam steering elements for providing the requisite parallelization of the received optical beams 122, contains a fixed array 184 of small photodiodes (not unlike a CCD in a digital camera) which will allow for the measuring of the actual location and distribution of a received optical beam 122. The test card 180 also comprises a control module 186 which processes the output of the photodiode array 184.

As part of the out-of-service calibration procedure, the $A^{th}$ optical transmitter element 110 on the $B^{th}$ transmit port card 102A is selected (and this selection is known to the control module 130 on the $B^{th}$ port card as well as the control module 186 on the test card 180), and the corresponding optical beam 112 is deflected by the transmit beam steering element array 114 on the $B^{th}$ port card with the intention of reaching a chosen "$C^{th}$ optical receive element" on one of the test cards, say test card 180. However, the "$C^{th}$ optical receive element on test card 180" is imaginary because the test card 180 does not contain optical receive elements but instead contains a photodiode array 184 which might conveniently be implemented as an array similar to a small CCD array as is used in digital camera technology. The photodiode array 184 detects the exact location of the received optical beam 122, which may (but likely will not) correspond to the position that would have been occupied by the beam steering element corresponding to the "$C^{th}$ optical receive element" had it been present. This difference in positions represents a pointing error, which is then converted into a compensation signal, and the process is repeated until the pointing error is sufficiently low to be considered satisfactory.

The above-described approach allows the major sources of tolerances (e.g., due to prism wedge angle and backplane spacing) to be compensated for before the first "in-traffic" connection, thereby either simplifying the precession routine or permitting less stringent tolerances on the backplane mirror, prism sheet, card positioning, etc.

Those skilled in the art will appreciate that in some embodiments, the functionality of the control module 130 and the processing module 924 may be implemented as pre-programmed hardware or firmware elements (e.g., application specific integrated circuits (ASICs), electrically erasable programmable read-only memories (EEPROMs), etc.), or other related components. In other embodiments, the control module 130 and the processing module 924 may be implemented as an arithmetic and logic unit (ALU) having access to a code memory (not shown) which stores program instructions for the operation of the ALU. The program instructions could be stored on a medium which is fixed, tangible and readable directly by the control module 130 and the processing module 924, (e.g., removable diskette, CD-ROM, ROM, or fixed disk), or the program instructions could be stored remotely but transmittable to the control module 130 and the processing module 924 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. Apparatus for redirecting a plurality of optical beams emanating from a respective plurality of optical transmitters arranged in a pattern along a first dimension and a second dimension, comprising:
    a plurality of first refractive regions;
    each first refractive region intercepting the optical beams emanating from an associated group of optical transmitters occupying a common position in the first dimension;
    each particular first refractive region having a fixed angular orientation with respect to each other first refractive region and imparting to the intercepted optical beams a fixed angular deflection in the first dimension, the fixed angular deflection in the first dimension being a function of the common position in the first dimension occupied by the optical transmitters from which emanate the optical beams intercepted by the particular first refractive region;
    a plurality of second refractive regions;
    each second refractive region intercepting the optical beams emanating from a second associated group of optical transmitters occupying a common position in the second dimension;
    each particular second refractive region having a fixed angular orientation with respect to each other second refractive region and imparting to the intercepted optical beams a fixed angular deflection in the second dimension, the fixed angular deflection in the second dimension being a function of the common position in the second dimension occupied by the optical transmitters from which emanate the optical beams intercepted by the particular second refractive region;
    the apparatus being implemented as an integral formation having a front face and a back face, wherein the first refractive regions appear on one of the front and back face and wherein the second refractive regions appear on the other of the front and back face.

2. Apparatus defined in claim 1, the fixed angular deflection in the first dimension further being a function of the angle at which the optical beams arrive at the apparatus.

3. Apparatus defined in claim 1, the fixed angular deflection in the second dimension further being a function of the angle at which the optical beams arrive at the apparatus.

4. Apparatus defined in claim 3, the first refractive regions being integrally formed into a first integral component, the second refractive regions being integrally formed into a second integral component, the first and second integral components being placed in series with one another.

5. Apparatus defined in claim 4, each of the first refractive regions defining a respective strip along a surface of the first integral component.

6. Apparatus defined in claim 5, each of the second refractive regions defining a respective strip along a surface of the second integral component.

7. Apparatus defined in claim 1,
  each first refractive region comprising a plurality of refractive sub-regions;
  different refractive sub-regions of the same first refractive region intercepting respective optical beams emanating from optical transmitters occupying different respective positions in the second dimension;
  each refractive sub-region of a particular first refractive region imparting to the respective intercepted optical beam a displacement in the second dimension, the displacement in the second dimension being a function of the position in the second dimension occupied by the respective intercepted optical beam.

* * * * *